US012637229B2

(12) United States Patent
Minas et al.

(10) Patent No.: US 12,637,229 B2
(45) Date of Patent: May 26, 2026

(54) METHODS AND APPARATUS FOR LEAK DETECTION AND MITIGATION FOR HYDROGEN FUELED AIRCRAFT

(71) Applicant: General Electric Company, Schenectady, NY (US)

(72) Inventors: Constantinos Minas, Slingerlands, NY (US); Lisa Tang, Schenectady, NY (US)

(73) Assignee: General Electric Company, Evendale, OH (US)

( * ) Notice: Subject to any disclaimer, the term of this patent is extended or adjusted under 35 U.S.C. 154(b) by 431 days.

(21) Appl. No.: 18/472,575

(22) Filed: Sep. 22, 2023

(65) Prior Publication Data

US 2025/0100705 A1 Mar. 27, 2025

(51) Int. Cl.
*G01M 3/16* (2006.01)
*B64D 37/30* (2006.01)
*B64D 37/32* (2006.01)

(52) U.S. Cl.
CPC ............. *B64D 37/32* (2013.01); *B64D 37/30* (2013.01); *G01M 3/16* (2013.01)

(58) Field of Classification Search
CPC .......... B64D 37/30; B64D 37/32; G01M 3/16
See application file for complete search history.

(56) References Cited

U.S. PATENT DOCUMENTS

| | | | |
|---|---|---|---|
| 4,062,184 A | 12/1977 | Hagen | |
| 6,095,251 A | 8/2000 | Mitchell et al. | |
| 6,518,574 B1 | 2/2003 | Castleman | |
| 8,943,827 B2 | 2/2015 | Prociw et al. | |
| 9,550,081 B2 | 1/2017 | Haaland et al. | |
| 9,845,014 B2 * | 12/2017 | Kim | B60L 50/72 |
| 12,480,867 B2 * | 11/2025 | John | G01N 33/0011 |
| 2006/0169024 A1 * | 8/2006 | Shoji | H01M 8/0447 |
| | | | 73/23.2 |
| 2020/0248580 A1 * | 8/2020 | Scarborough | B64F 5/60 |
| 2021/0214093 A1 | 7/2021 | Bruno | |
| 2021/0381437 A1 * | 12/2021 | Ponyavin | C10K 1/002 |
| 2022/0131165 A1 * | 4/2022 | Ballantine | H01M 8/04447 |
| 2022/0307421 A1 * | 9/2022 | Sibbach | F02C 7/224 |
| 2022/0307428 A1 * | 9/2022 | Sibbach | F02C 3/22 |
| 2022/0397478 A1 * | 12/2022 | Shenouda | G01M 3/2815 |
| 2022/0397479 A1 * | 12/2022 | Shenouda | F02C 7/22 |

(Continued)

*Primary Examiner* — Alexander A Mercado

(74) *Attorney, Agent, or Firm* — Hanley, Flight & Zimmerman, LLC

(57) ABSTRACT

Systems, apparatus, articles of manufacture, and methods for leak detection and mitigation for hydrogen fueled aircraft are disclosed. An example apparatus disclosed herein includes machine readable instructions, and programmable circuitry to at least one of instantiate or execute the machine readable instructions to determine a hydrogen concentration threshold for a location within an undercowl of an engine of an aircraft, based on an engine condition of the aircraft, determine, based on an output of a hydrogen concentration sensor within the undercowl, a hydrogen concentration at the location, compare the hydrogen concentration to the hydrogen concentration threshold, and conduct a mitigation action in the hydrogen fuel distribution system based on the comparison of the hydrogen concentration and the hydrogen concentration threshold.

20 Claims, 11 Drawing Sheets

(56) References Cited

U.S. PATENT DOCUMENTS

| | | | |
|---|---|---|---|
| 2023/0016408 A1* | 1/2023 | Meshkin Fam | F01D 17/02 |
| 2023/0102097 A1* | 3/2023 | Soulie | F16L 17/06 |
| | | | 285/123.15 |
| 2023/0107610 A1 | 4/2023 | Minas et al. | |
| 2023/0122350 A1 | 4/2023 | Minas et al. | |
| 2023/0159185 A1 | 5/2023 | Minas | |
| 2024/0043137 A1* | 2/2024 | Witalis | G01M 15/14 |
| 2024/0110524 A1* | 4/2024 | Minas | B64D 37/30 |
| 2025/0101923 A1* | 3/2025 | Farah | B64D 37/005 |
| 2025/0153857 A1* | 5/2025 | Porterfield | B64D 37/005 |

* cited by examiner

METHODS AND APPARATUS FOR LEAK DETECTION AND MITIGATION FOR HYDROGEN FUELED AIRCRAFT

FIELD OF THE DISCLOSURE

This disclosure relates generally to hydrogen fuel distribution systems and, more particularly, to methods and apparatus for leak detection and mitigation for hydrogen fueled aircraft.

BACKGROUND

Aircraft fuel distribution systems support fuel storage and fuel distribution to an engine. In some examples, a fuel system can include a single, gravity feed fuel tank with an associated fuel line connecting the tank to the aircraft engine. In some examples, multiple fuel tanks can be present as part of the fuel distribution system. These tank(s) can be located in a wing, a fuselage, and/or a tail of the aircraft. The tank(s) can be connected to internal fuel pump(s) with associated valve(s) and/or plumbing to permit feeding of the engine, refueling, defueling, individual tank isolation, and/or overall optimization of an aircraft's center of gravity.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

DETAILED DESCRIPTION

Figure 1:
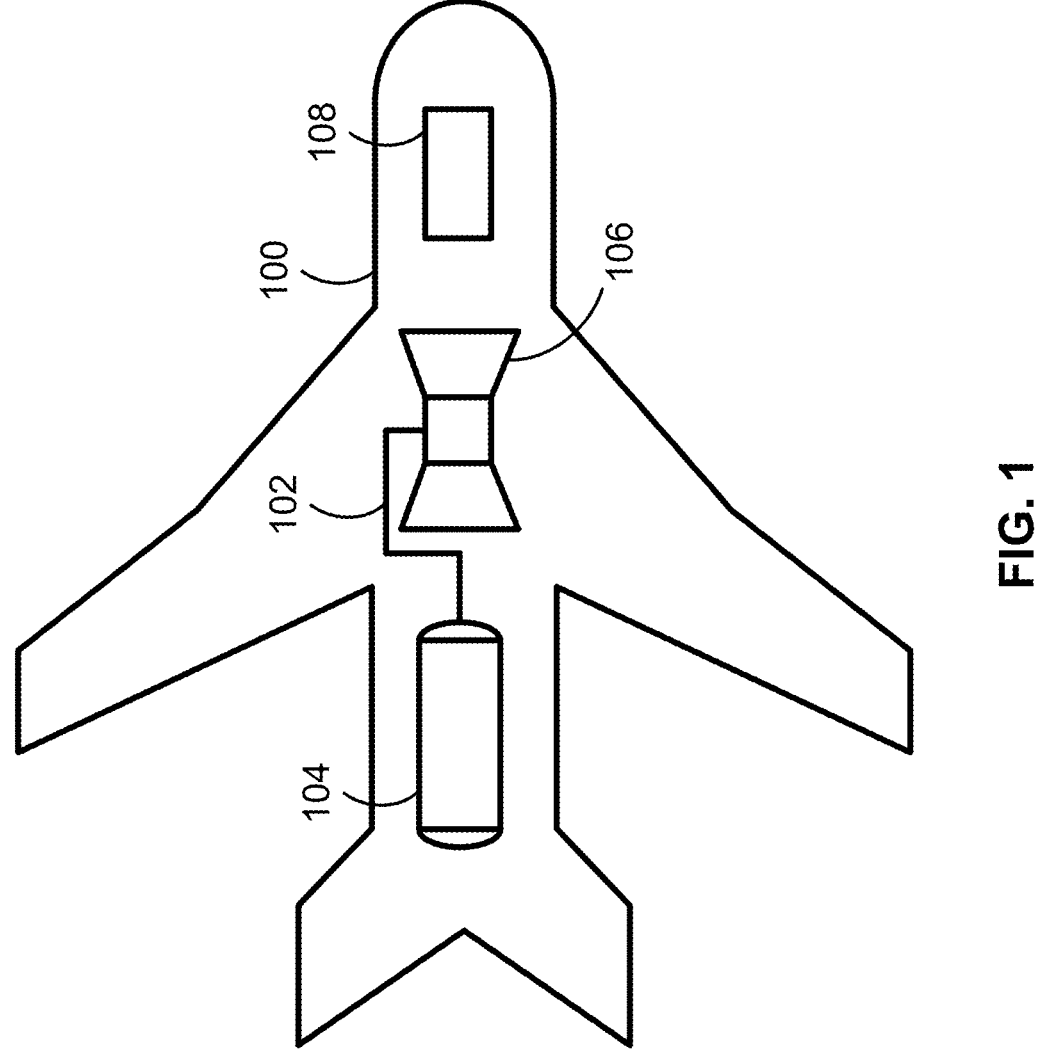
FIG. 1 is a simplified illustration of an aircraft including a hydrogen fuel distribution system in which the teachings of this disclosure can be implemented.

Pressurized gaseous hydrogen and liquid hydrogen are energy-dense fuel sources that can be used to power gas turbine engines. However, the small molecular size of hydrogen makes leaks in hydrogen fuel distribution systems more common than leaks in conventional fuel distribution systems. Examples disclosed herein include leak detection systems of a hydrogen fuel distribution system of a gas turbine engine that identify and mitigate leaks in the undercowl of the gas turbine engine. Examples disclosed herein determine the hydrogen concentration at one or more locations within the undercowl and compare the determined hydrogen concentration to one or more thresholds associated with that location. In some examples disclosed herein, the comparison of the hydrogen concentration to the threshold can be used to identify leaks associated with ignition and/or detonation risks. In some such examples disclosed herein, mitigation actions can be taken to reduce the ignition and/or detonation risk associated with the leak.

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with a set of axes including the yaw axis Y, the roll axis R, and the pitch axis P. In some examples disclosed herein, the orientation of features is described with reference to clock positions. In these examples, the clock positions are described in reference to the position of the features in a plane defined by the yaw axis and pitch axis (the Yaw-Pitch plane), wherein the 12 o'clock position is oriented along the yaw-axis.

Pressurized and/or liquid hydrogen can be used as a fuel for a variety of applications, including gas turbine engines. Given the high pressure of the stored hydrogen, the extremely low temperature of the hydrogen, and the high flammability of hydrogen, leaks from tanks and/or other components of hydrogen storage systems (e.g., pumps, valves, heat exchangers, pipe junctions, etc.) can be problematic. For example, a hydrogen leak can cause elevated levels of hydrogen within portions of a gas turbine engine. Such elevated levels of hydrogen, if exposed to an ignition source, can ignite or detonate (e.g., depending on the concentration of hydrogen and the ambient conditions, etc.), which can be detrimental to the operation of the gas turbine engine. Additionally, leaks can reduce the fuel efficiency of gas turbine engines.

Examples disclosed herein include systems that detect and mitigate leaks within a hydrogen fuel distribution system of a gas turbine engine. In some examples disclosed herein, a leak within a fuel distribution system can be detected by identifying places of interest within the gas turbine engine (e.g., potential leak locations, potential ignition sources, etc.), determining the hydrogen concentrations associated with flammability risk and detonation risk as a function of engine condition, and estimating the hydrogen concentrations at the places of interest based on the output of the hydrogen concentration sensors of the engine. In some examples disclosed herein, a leak within a fuel distribution system can be detected by determining, at a hydrogen concentration sensor location, a flammability threshold and/or a detonation threshold based on the engine condition and comparing the output of the hydrogen concentration sensor to the dynamically determined threshold. In some examples disclosed herein, if a leak and/or fire is detected, mitigation actions can be taken, including operating a ventilation system of the gas turbine engine, opening one or more vent valves, disabling the fuel system, activating the fire suppression system, etc.

FIG. 1 is an example illustration of an aircraft 100 including an example fuel distribution system 102. The fuel distribution system 102 includes an example tank 104 of hydrogen, which provides fuel to an example gas turbine engine 106. Example implementations of the fuel distribution system 102 are described below in conjunction with FIGS. 2 and 3. The example tank 104 can contain hydrogen in various states, including liquid, gaseous, and cryo-compressed states. The example tank 104 can be stored in any suitable location on the aircraft (e.g., in the wings, in the fuselage, in an external tank, etc.). In other examples, the tank 104 can include multiple tanks (herein referred to as a tank bank, etc.).

Although the aircraft 100 shown in FIG. 1 is an airplane, the embodiments described herein may also be applicable to other fixed-wing aircraft, including unmanned aerial vehicles (UAV). The fuel distribution system 102 can be used to provide hydrogen fuel that will be combusted in an example gas turbine engine 106 of the aircraft 100. In the illustrated example of FIG. 1, the aircraft includes a single gas turbine engine (e.g., the gas turbine engine 106, etc.). In some examples, the aircraft 100 can include multiple gas turbine engines, such as multiple gas turbine engines mounted beneath the wings of the aircraft 100.

In FIG. 1, the fuel distribution system 102 is controlled and monitored by example fuel distribution controller circuitry 108. For example, the fuel distribution controller circuitry 108 monitors the health of the fuel distribution system 102. For example, the fuel distribution controller circuitry 108 can determine an outflow of hydrogen from the tank 104 and inflow of hydrogen into the gas turbine engine 106. In some examples, the fuel distribution controller circuitry 108 can determine that a leak and/or fire is present in the fuel distribution system 102. In some such examples, when a leak or fire is detected in the fuel distribution system 102, the fuel distribution controller circuitry 108 can take mitigation actions to address the leak and/or fire. Example implementations of the fuel distribution controller circuitry 108 are described below in conjunction with FIGS. 4-6.

The embodiments of the fuel tank(s) described herein may also be applicable to other applications where hydrogen is used as a fuel in the aircraft 100. The embodiments described herein also may be applicable to engine(s) other than gas turbine engines. While the gas turbine engine 106 is a power generator for the aircraft 100 that uses hydrogen as a fuel, hydrogen may also be used as a fuel for other power generators. For example, a power generator may be a fuel cell (e.g., hydrogen fuel cell, etc.) where the hydrogen is provided to the fuel cell to generate electricity by reacting with air.

Figure 2:
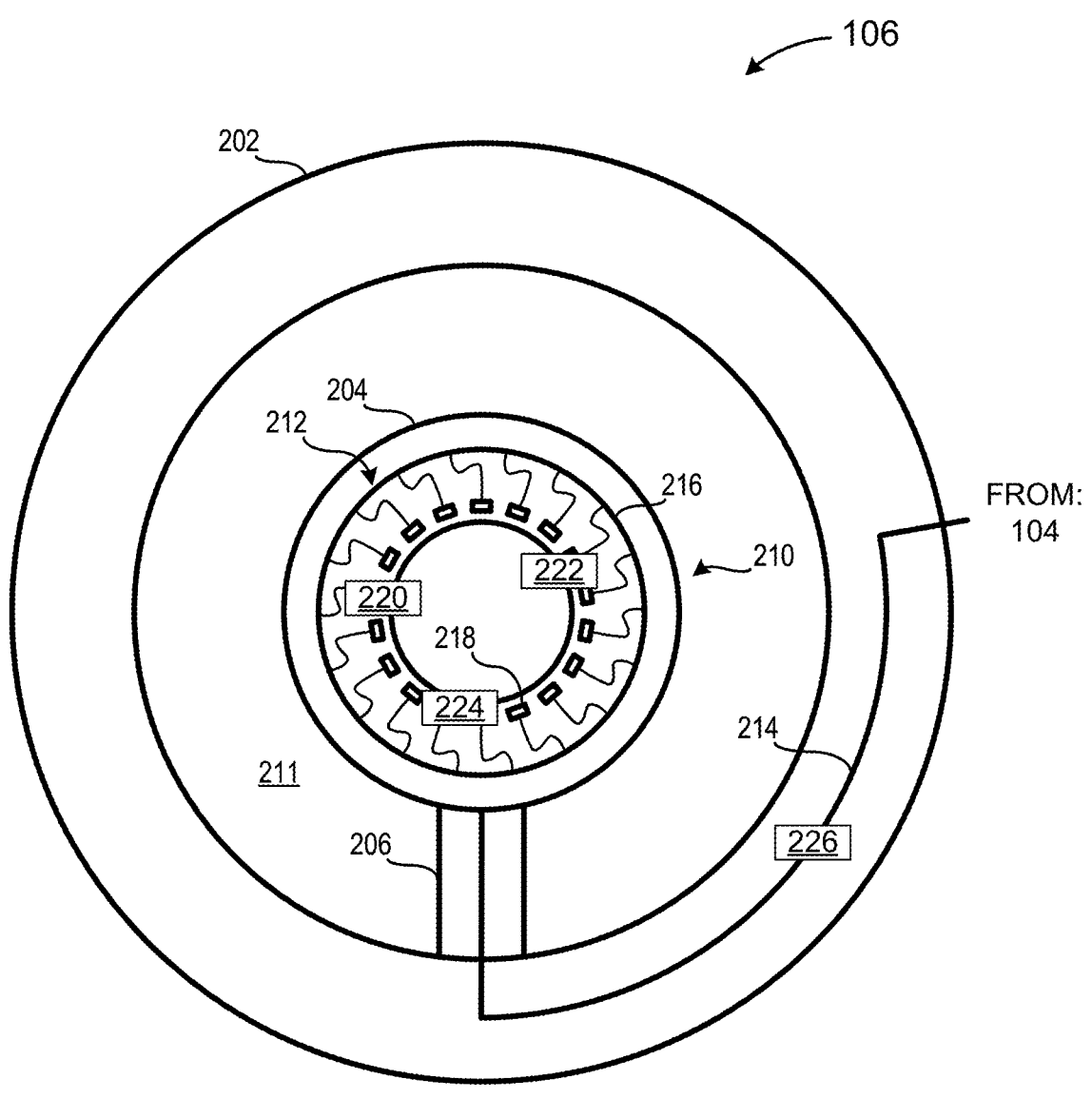
FIG. 2 is a schematic diagram of a cross section of the gas turbine engine of FIG. 1 illustrating the flow of hydrogen fuel therethrough.

FIG. 2 is a schematic diagram of a cross-section of the gas turbine engine 106 of FIG. 1 including a portion of the fuel distribution system 102 of FIG. 1. In the illustrated example of FIG. 2, the gas turbine engine 106 includes an example fan frame 202, an example core frame 204, an example bifurcation 206, an example engine core 210, and an example bypass 211. In the illustrated example of FIG. 2, the area within the core frame 204 surrounding the engine core 210 is referred to as an undercowl 212. In the illustrated example of FIG. 2, the fuel distribution system 102 includes an example inlet line 214, an example fuel manifold 216, and an example plurality of inlets 218. In the illustrated example of FIG. 2, the fuel distribution system 102 includes an example first hydrogen concentration sensor 220, an example second hydrogen concentration sensor 222, an example third hydrogen concentration sensor 224, and an example fuel line sensor 226.

In the illustrated example of FIG. 2, the fan frame 202 (e.g., the fan nacelle, etc.) is an annular casing that surrounds the fan (not illustrated) of the gas turbine engine 106, the bypass 211, and the core frame 204. It should be appreciated that the fan frame 202 can be absent in some configurations of the gas turbine engine 106. In the illustrated example of FIG. 2, the bifurcation 206 extends between the fan frame 202 and the core frame 204 in the bypass 211. The bifurcation 206 is a structural component that supports the core frame 204 within the fan frame 202 and bypass 211. In the illustrated example of FIG. 2, the bifurcation 206 is disposed generally at the 6 o'clock position. In other examples, the bifurcation 206 can be disposed at any other suitable location. In some examples, the gas turbine engine 106 can include any suitable number of bifurcations (e.g., two bifurcations, three bifurcations, etc.).

In the illustrated example of FIG. 2, the core frame 204 (e.g., the core nacelle, etc.) is a generally tubular casing that encases or at least partially forms the engine core 210. The engine core 210 includes the turbo-machinery, other than the fan, and combustor of the gas turbine engine 106. For example, the engine core 210 can include, in serial flow order, a low pressure compressor (LPC) (not illustrated), a high pressure compressor (HPC) (not illustrated), a combustor (not illustrated), a high pressure turbine (HPT) (not illustrated), low pressure turbine (LPT) (not illustrated), and an exhaust nozzle section (not illustrated). In the illustrated example of FIG. 2, the gas turbine engine 106 is a turbofan engine. It should be appreciated that the teachings of this disclosure are also applicable to gas turbine engines that have different configurations (e.g., turbojet, turboprop, open-rotor, turboshaft, etc.).

The fuel distribution system 102 supplies fuel to the engine core 210 from a hydrogen supply of the gas turbine engine 106 (e.g., the tank 104, etc.). During operation, the hydrogen flows through the inlet line 214, which extends through the bifurcation 206, into the fuel manifold 216, which distributes the hydrogen between the plurality of inlets 218. In the illustrated example of FIG. 2, the plurality of inlets 218 enable the hydrogen fuel to enter the engine core 210. In the illustrated example of FIG. 2, the plurality of inlets 218 are distributed circumferentially around the engine core 210. In other examples, the plurality of inlets 218 can have any other suitable distribution. Some or all of the plurality of inlets 218 can be implemented by fuel nozzles. In some examples, the plurality of inlets 218 can inject fuel into a combustor (not illustrated) of the engine core 210. Additionally or alternatively, the plurality of inlets 218 can inject fuel into the compressor discharge nozzle (CDN) (e.g., the air spray nozzle, etc.), which mixes the hydrogen fuel into compressed air from a compressor (not illustrated, etc.) of the engine core 210. In the illustrated example of FIG. 2, the plurality of inlets 218 includes 18 inlets. In other examples, the plurality of inlets 218 can include any other suitable number of inlets (e.g., 1 inlet, 5 inlets, 20 inlets, 50 inlets, etc.).

The hydrogen concentration sensors 220, 222, 224, also referred to herein as gas sensors, are sensors that measure the concentration of hydrogen (e.g., the hydrogen concentration, etc.) in the adjacent air (e.g., the air surrounding the respective sensors, etc.). In some examples, each of the hydrogen concentration sensors 220, 222, 224 outputs an electrical parameter (e.g., a voltage, a current, etc.) that corresponds to a particular concentration of hydrogen around the corresponding one of the hydrogen concentration sensors 220, 222, 224. In some examples, the hydrogen concentration sensors 220, 222, 224 can be implemented by one or more metal oxide semiconductor (MOS) sensors, one or more thermal conductivity sensor(s), one or more catalytic sensor(s), one or more electrochemical sensor(s), one or more other hydrogen sensor(s), and/or a combination thereof. In the illustrated example of FIG. 2, the fuel distribution system 102 includes three hydrogen concentration sensors (e.g., the hydrogen concentration sensors 220, 222, 224, etc.). In other examples, the fuel distribution system 102 can include any other suitable number of hydrogen concentration sensors (e.g., one sensor, two sensors, five sensors, ten sensors, etc.). In some examples, other components of the gas turbine engine 106 and/or the aircraft 100 can include hydrogen concentration sensors.

The fuel line sensor 226 measures parameters related to the properties of the hydrogen flowing through the inlet line 214. For example, the fuel line sensor 226 can be a flowmeter to measure a flow rate (e.g., the mass flow rate, the volume flow rate, etc.) of hydrogen flowing through the inlet line 214. Additionally or alternatively, the fuel line sensor 226 can measure other parameters, that can be used to determine the flow rate of hydrogen through the inlet line 214 (e.g., the temperature of the hydrogen, the pressure of the hydrogen, etc.). In some examples, the fuel line sensor 226 can measure a pressure of the hydrogen flowing therethrough.

Figure 3:
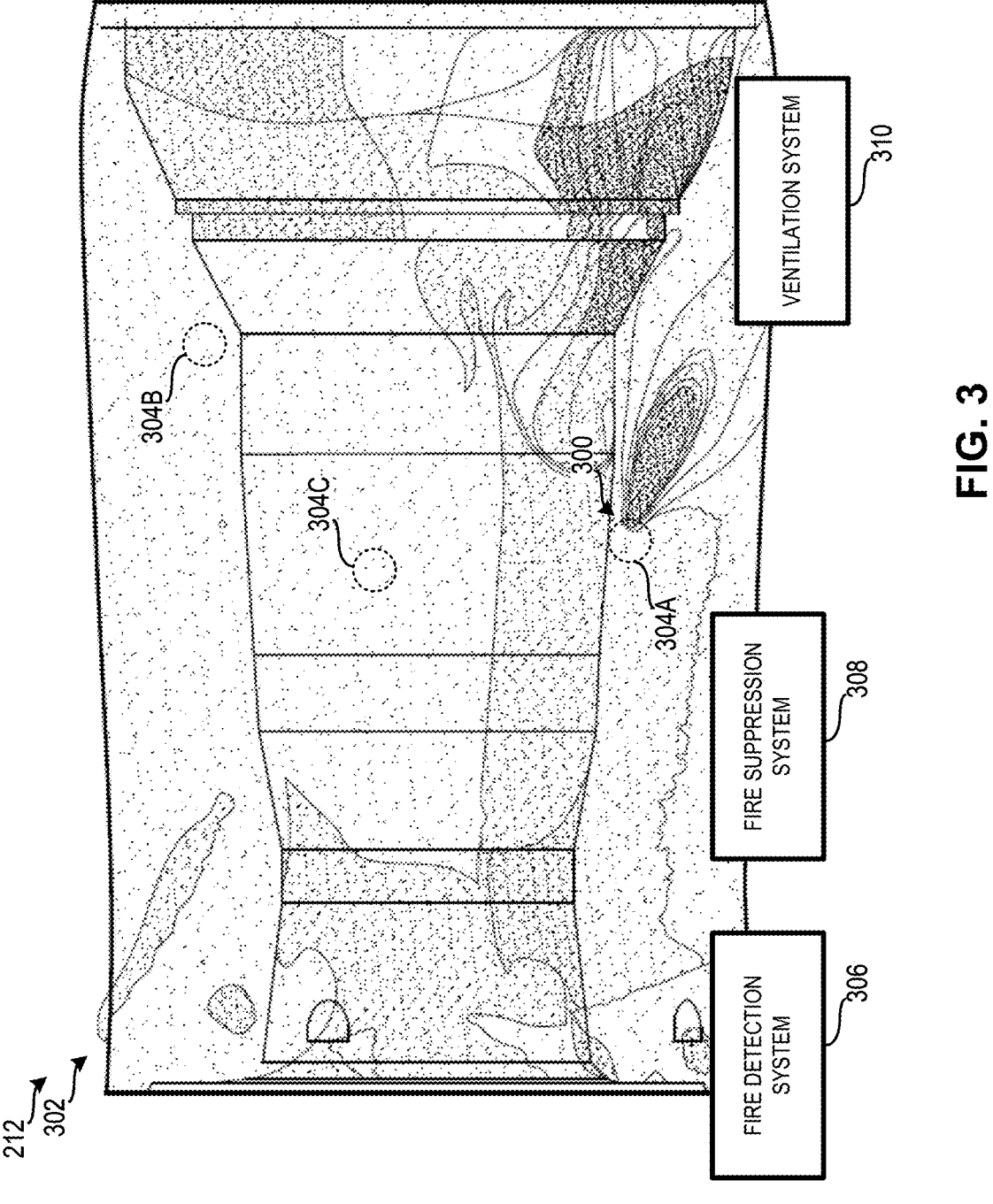
FIG. 3 is a side view of the undercowl of the gas turbine engine of FIGS. 1 and 2 depicting the hydrogen concentration associated with an example leak.

FIG. 3 is a side view of the undercowl 212 of the gas turbine engine of FIGS. 1 and 2 depicting the hydrogen concentration associated with an example leak 300, which causes the undercowl 212 to have an example hydrogen distribution 302. In the illustrated example of FIG. 3, the undercowl 212 includes plurality of locations of interest (LOI), including a first LOI 304A, an example second LOI 304B, and an example third LOI 304C. In the illustrated example of FIG. 3, an example fire detection system 306 monitors for fires in the undercowl 212, an example fire suppression system 308 suppresses fire within the undercowl 212, and an example ventilation system 310 ventilates the undercowl 212. In the illustrated example of FIG. 3, the hydrogen distribution 302 is represented via dot shading. Generally, more dense dot shading corresponds to greater concentrations of hydrogen within the hydrogen distribution 302.

In the illustrated example of FIG. 3, the hydrogen distribution 302 corresponds to a steady-state condition associated with the leak 300. For example, due to the low molecular weight of hydrogen and the high pressure of the hydrogen in the fuel distribution system 102 (FIG. 1), hydrogen from the leak 300 and/or actual leaks in the fuel distribution system 102, quickly reaches a steady-state condition (e.g., within less than ten seconds, etc.) where the hydrogen distribution 302 is steady (e.g., is no longer time-variant, etc.). In some examples, the hydrogen distribution 302 caused by the leak 300 can be based on the condition of the gas turbine engine 106 (FIG. 1) and/or the aircraft 100 (FIG. 1). For example, the hydrogen distribution 302 can be based (e.g., influenced, etc.) by one or more parameters including the mission phase of the aircraft 100 (e.g., ground idle, cruise, takeoff, etc.), the ambient conditions of the aircraft 100 (e.g., altitude, temperature, air pressure, etc.), the speed of the gas turbine engine 106, the pressure of the fuel distribution system 102, a flow rate of hydrogen through the fuel distribution system 102. In some such examples, these parameters can cause the hydrogen distribution 302 to change for the leak 300 (e.g., the parameters can cause hydrogen from a leak of the same size at same location to spread differently within the undercowl 212, etc.). In the illustrated example of FIG. 3, the undercowl 212 includes the LOIs 304A, 304B, 304C. In some examples, the LOIs 304A, 304B, 304C are locations within the undercowl 212 at which hydrogen concentration is to be tracked. For example, the LOIs 304A, 304B, 304C can be located next to potential ignition sources (e.g., near electric components, near the combustor of the engine core 210, etc.), next to potential leak locations (e.g., near junctions of pipes, near valves, etc.), and/or near components of the gas turbine engine 106 that are vulnerable to fire. In some examples, the LOIs 304A, 304B, 304C are distal (e.g., not adjacent, not near, etc.) to hydrogen concentration sensors of the fuel distribution system 102 (e.g., the hydrogen concentration sensors 220, 222, 224 of FIG. 2, etc.). Additionally or alternatively, the LOIs 304A, 304B, 304C can be adjacent to one or more of the hydrogen concentration sensors of the fuel distribution system 102 (e.g., the hydrogen concentration sensors 220, 222, 224 of FIG. 2, etc.). While the undercowl 212 includes three LOIs 304A, 304B, 304C, it should be appreciated that the undercowl 212 can include any suitable number of locations of interest (e.g., 1 location of interest, 5 locations of interest, 100 locations of interest, etc.).

The fire detection system 306 monitors the undercowl 212 for fires within the undercowl 212 and/or the gas turbine engine 106. For example, the fire detection system 306 can output a signal indicative of whether there is a current fire within the undercowl 212. In some examples, the fire detection system 306 can include a multi-spectrum infrared (MIR) detector. Additionally or alternatively, the fire detection system 306 can include one or more other thermal sensors, one or more radiation sensors, and/or one or more particulate sensors.

The fire suppression system 308 suppresses fire within the undercowl 212 when a fire is detected by the fire detection system 306. For example, the fire suppression system 308 can include a water suppression system (e.g., sprinklers, a water mist system, etc.), a carbon dioxide suppression system, and/or a fire extinguishing chemical agent (e.g., a pentafluoroethane, Perfluoro(2-methyl-3-pentanone), tetrafluoroethane, a noble gas, an inert gas, a fluoroform, an apaflurane, a haloalkane, a combination thereof, etc.). The ventilation system 310 ventilates the undercowl 212. For example, the ventilation system 310 can cause air from the bypass (e.g., the bypass 211 of FIG. 2, etc.) to enter the undercowl 212. In some examples, the ventilation system 310 can include a controllable element (e.g., a motor-driven fan, a valve, an opening with controllable size, etc.) that can be used to control a rate of ventilation within the undercowl 212. In some such examples, the ventilation system 310 can be used to remove hydrogen (e.g., from the leak 300, etc.) from the undercowl 212.

Figure 4:
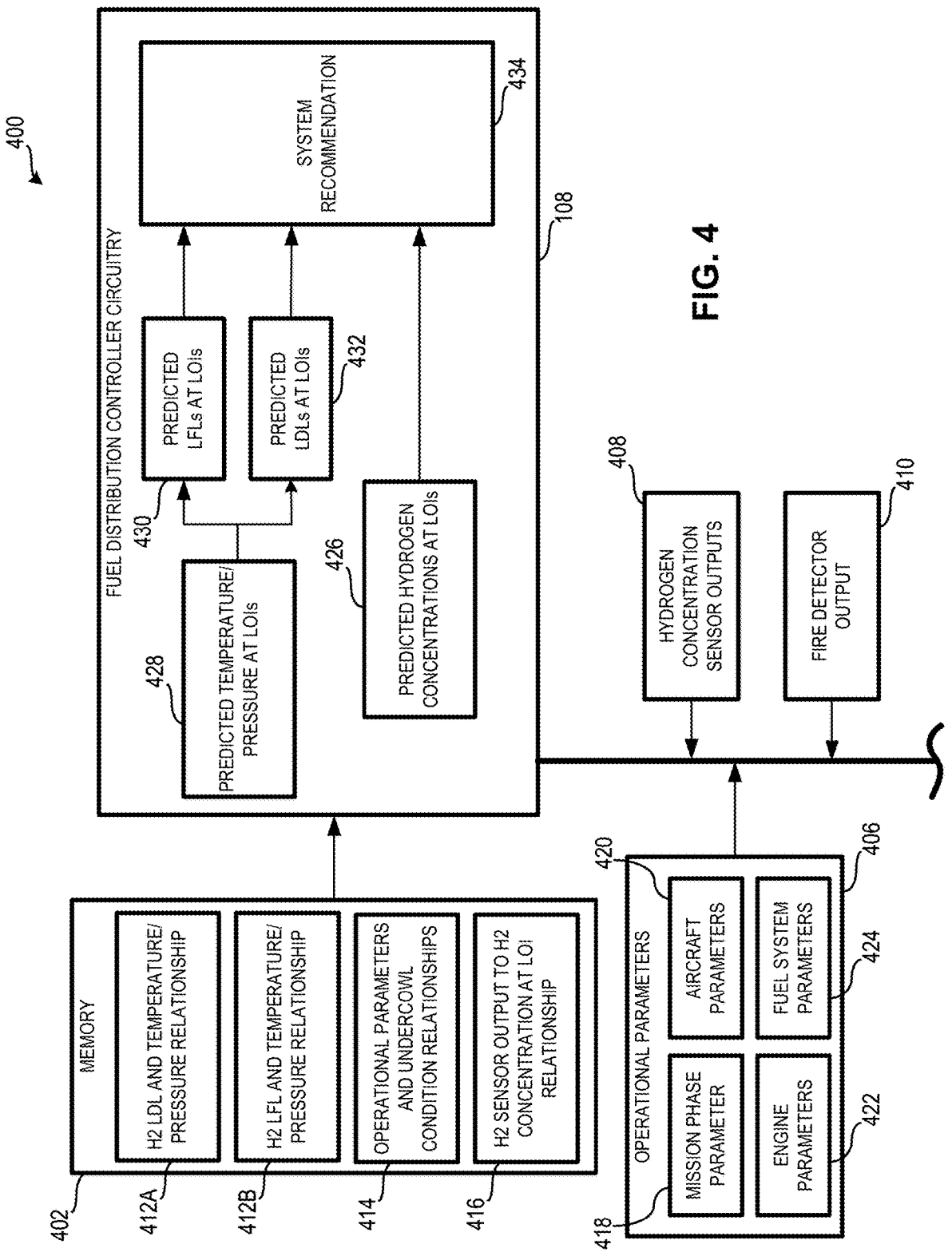
FIG. 4 is a block diagram of an example first leak detection system including example fuel distribution controller circuitry implemented in accordance with the teachings of this disclosure.

FIG. 4 is a block diagram of an example first leak detection system 400 implemented in accordance with the teachings of this disclosure. In the illustrated example of FIG. 4, the leak detection system includes the fuel distribution controller circuitry 108 of FIG. 1 and example memory 402. In the illustrated example of FIG. 4, the fuel distribution controller circuitry 108 accesses (e.g., receives, requests, etc.) example operational parameters 406, example hydrogen concentration sensor outputs 408, and an example fire detector output 410. In the illustrated example of FIG. 4, the memory 402 includes (e.g., stores, etc.) example first relationship(s) 412A, example second relationship(s) 412B, example third relationship(s) 414, and example fourth relationship(s) 416. In the illustrated example of FIG. 4, the operational parameters 406 (e.g., engine condition parameters, etc.) include an example mission phase parameter 418, example aircraft parameters 420, example engine parameters 422, and example fuel system parameters 424.

The memory 402 is computer memory associated with the aircraft 100, the gas turbine engine 106, and/or a user thereof. In some examples, the memory 402 can be associated with the controller of the gas turbine engine 106. In some examples, the memory 402 can be implemented by the local memory 1113 of FIG. 11, the volatile memory 1114 of FIG. 11, the non-volatile memory 1116 of FIG. 11 and/or the mass storage device 1128 of FIG. 11.

The hydrogen concentration sensor outputs 408 are outputs of the hydrogen concentration sensors within the undercowl 212 (e.g., the hydrogen concentration sensors 220, 222, 224, etc.). In some examples, the hydrogen concentration sensor outputs 408 correspond to the concentration of hydrogen at specific locations within the undercowl 212 (e.g., the location of the corresponding hydrogen concentration sensors, etc.). In some examples, the hydrogen concentration sensor outputs 408 are the relative concentration of hydrogen (e.g., the percentage of hydrogen in the gas at the corresponding sensor, a parts-per-million (ppm) of hydrogen at the corresponding sensor, etc.). The fire detector output 410 is the output of a fire detection system (e.g., the fire detection system 306, etc.). In some examples, the fire detector output 410 can be binary (e.g., a first output for no fire detected, a second output for a fire detected, etc.). In other examples, the fire detector output 410 can indicate a location of fire within the undercowl 212 (e.g., at a location of interest within the undercowl 212, etc.).

The first relationship(s) 412A are the relationship(s) between the lower detonation limit (LDL) of a H2/air mixture as a function of temperature and pressure. That is, the first relationship(s) 412A relates the minimum hydrogen concentration (e.g., H2 in air, etc.) that is able to detonate to the temperature and the pressure of the H2/air mixture. In some examples, the first relationship(s) 412A can be determined empirically. In other examples, the first relationship(s) 412A is determined analytically. In some examples, the first relationship(s) 412A can be stored as a lookup table (e.g., a table similar to Table 1 below, etc.) and/or a graphical relationship. In other examples, the first relationship(s) 412A can be stored as a mathematical function (e.g., the LDL as a function of temperature and pressure, etc.). Generally, increasing the ambient temperature decreases the LDL of hydrogen, and increasing the ambient pressure increases the LDL of hydrogen.

The second relationship(s) 412B are the relationship between the LFL of a H2/air mixture as a function of temperature and pressure. That is, the second relationship(s) 412B relates the minimum hydrogen concentration (e.g., H2 in air, etc.) that is able to ignite/burn to the temperature and the pressure of air. In some examples, the second relationship(s) 412B can be determined empirically. In other examples, the second relationship(s) 412B is determined analytically. In some examples, the second relationship(s) 412B can be stored as a lookup table (e.g., Table 1, etc.) and/or a graphical relationship. In other examples, the second relationship(s) 412B can be stored as a mathematical function (e.g., the LFL as a function of temperature and pressure, etc.). Generally, increasing the ambient temperature decreases the LFL of hydrogen and increasing the ambient pressure increases the LFL of hydrogen. Generally, the LDL of an H2/air mixture is greater than the LFL of the mixture at the same temperature and pressure.

An example look-up table that can be used to implement the second relationship(s) 412B is depicted below:

TABLE 1

| LFL as a function of Pressure and Temperature | | |
|---|---|---|
| Temperature (Fahrenheit) | Pressure (pounds per square inch) | H2 LFL (% Volume) |
| 0 | 5 | 5.9561 |
| 100 | 5 | 5.563 |
| 200 | 5 | 5.1699 |
| 300 | 5 | 4.7769 |
| 400 | 5 | 4.3838 |
| 500 | 5 | 3.9907 |
| 0 | 10 | 6.036 |
| 100 | 10 | 5.6429 |
| 200 | 10 | 5.2499 |
| 300 | 10 | 4.8568 |
| 400 | 10 | 4.4637 |
| 500 | 10 | 4.0706 |
| 0 | 15 | 6.1365 |
| 100 | 15 | 5.7435 |
| 200 | 15 | 5.3504 |
| 300 | 15 | 4.9573 |
| 400 | 15 | 4.5642 |
| 500 | 15 | 4.1712 |
| 0 | 20 | 6.1452 |
| 100 | 20 | 5.7521 |
| 200 | 20 | 5.359 |
| 300 | 20 | 4.966 |
| 400 | 20 | 4.5729 |
| 500 | 20 | 4.1798 |

In Table 1, the first column represents the temperature of the gas in degrees Fahrenheit, the second column represents the pressure of the gas in pounds per square inch (psi), and the third column represents the lower flammability limit (LFL) of hydrogen by percentage by volume. In such examples, if the temperature and pressure of the ambient temperature are known, the Table 1 can be used to determine the LFL of hydrogen as a percentage by volume.

The third relationship(s) 414 are the relationship(s) between the operational parameters 406 and the undercowl condition(s). For example, the third relationship(s) 414 can relate the undercowl condition(s) (e.g., the temperature, the pressure, the flowrate, etc.) of the undercowl 212 of FIGS. 2 and 3 to one or more of the operational parameters 406. For example, the third relationship(s) 414 can relate the mission phase parameter 418 and/or the engine parameters 422 to the condition(s) of the undercowl 212. In some examples, the third relationship(s) 414 can include a pressure map of the undercowl 212 as a function of the mission phase parameter 418 and/or the engine parameters 422. In some examples, the third relationship(s) 414 can include a flow rate map of the undercowl 212 as a function of the mission phase parameter 418 and/or the engine parameters 422. In some examples, the third relationship(s) 414 can include a thermal profile of the undercowl 212 for each mission phase (e.g., a first thermal profile for cruise, a second thermal profile for takeoff, a third thermal profile for climb, etc.). In some examples, the third relationship(s) 414 can be stored as a lookup table and/or a graphical relationship. In other examples, the third relationship(s) 414 can be stored as a mathematical function (e.g., the temperature and pressure distributions of the undercowl 212 as a function of one or more of the operational parameters 406, etc.). In some examples, the third relationship(s) 414 can include a single temperature and/or pressure for each location of interest for each mission phase. An example look-up table that can be used to implement the first relationship(s) 412A with a single temperature and pressure for each mission is depicted below:

TABLE 2

Temperature and Pressure at LOIs at various mission phases

| Mission Phase | Location of Interest | Temperature (Fahrenheit) | Pressure (pounds per square inch) |
|---|---|---|---|
| Ground Idle | LOI 1 | 300 | 15 |
| Ground Idle | LOI 2 | 350 | 15 |
| Ground Idle | LOI 3 | 400 | 15 |
| Takeoff | LOI 1 | 350 | 10 |
| Takeoff | LOI 2 | 400 | 10 |
| Takeoff | LOI 3 | 450 | 10 |
| Cruise | LOI 1 | 300 | 5 |
| Cruise | LOI 2 | 350 | 5 |
| Cruise | LOI 3 | 400 | 5 |
| . | . | . | . |
| . | . | . | . |
| . | . | . | . |

In Table 2, the first column represents the mission phase, the second column represents the location of interest (e.g., the LOIs 304A, 304B, 304C of FIG. 3, etc.), the third column represents the temperature of the gas in degrees Fahrenheit, and the fourth column represents the pressure of the gas in pounds per square inch (psi). It should be appreciated that Table 2 can include additional mission phases (e.g., climb, descent, approach, etc.). Table 2 can be used to determine the expected condition at each of the LOIs 304A, 304B, 304C during each mission phase. In such examples, if the temperature and pressure of the ambient temperature are known, the Table 1 can be used to determine the LFL of hydrogen as a percentage by volume.

The fourth relationship(s) 416 are the relationship(s) between the hydrogen concentration sensor outputs 408 and the hydrogen concentrations at the LOIs within the undercowl 212 (e.g., the LOIs 304A, 304B, 304C of FIG. 3, etc.). In some examples, the fourth relationship(s) 416 can be a hydrogen distribution within the undercowl 212 generated based on the hydrogen concentration sensor outputs 408 (e.g., a hydrogen distribution map similar to the hydrogen distribution 302 of FIG. 3, etc.). Additionally or alternatively, the fourth relationship(s) 416 can be a predicted hydrogen concentration at one or more of the LOIs (e.g., a first hydrogen concentration at the first LOI 304A based on the hydrogen concentration sensor outputs 408, a second hydrogen concentration at the second LOI 304B based on the hydrogen concentration sensor outputs 408, a third hydrogen concentration at the third LOI 304C based on the hydrogen concentration sensor outputs 408, etc.). In some examples, the fourth relationship(s) 416 can be determined analytically (e.g., via computational fluid dynamics, etc.), empirically, and/or by simulating a leak via gas flow simulation software.

For example, if the hydrogen concentration sensors 220, 222, 224 output 0.95 H2 percent volume, 1 H2 percent volume and 5 H2 percent volume, respectively, the fourth relationship(s) 416 can be used to determine a hydrogen concentration of 9.75 H2 percent volume, 7.5 H2 percent volume, and 6 H2 percent volume at the LOIs 304A, 304B, 304C, respectively. For example, if the hydrogen concentration sensors 220, 222, 224 output 0.8 H2 percent volume, 0.85 H2 percent volume and 15 H2 percent volume, respectively, the fourth relationship(s) 416 can be used to determine a hydrogen concentration of 4.125 H2 percent volume, 4.625 H2 percent volume, and 4 H2 percent volume at the LOIs 304A, 304B, 304C, respectively. It should be appreciated that the fourth relationship(s) 416 can vary based on the geometry and fluid flow paths through the undercowl 212.

The mission phase parameter 418 is a parameter related to the current mission phase of the aircraft 100 of FIG. 1. For example, the mission phase parameter 418 can be a parameter that indicates whether the aircraft is currently in ground idle, takeoff, cruise, landing, etc. In some examples, the mission phase parameter 418 can be input by an operator of the aircraft 100. In other examples, the mission phase parameter 418 can be accessed from an autopilot system of the aircraft 100. The aircraft parameters 420 relate to the aircraft 100 and/or the current conditions of the aircraft 100. For example, the aircraft parameters 420 can include altitude, location (e.g., latitude, longitude, etc.), and/or model information relating to the aircraft parameters 420. In some examples, the aircraft parameters 420 can be received from a location sensor of the aircraft 100 (e.g., a global position system (GPS) of the aircraft 100, an inertial navigation system (INS) of the aircraft 100, an altimeter of the aircraft 100, etc.). Additionally or alternatively, the aircraft parameters 420 can be input by a user of the aircraft 100.

The engine parameters 422 are parameters related to the gas turbine engine 106. For example, the engine parameters 422 can include the engine speed of the gas turbine engine 106 and/or any other suitable parameters related to the gas turbine engine 106 (e.g., a position of a variable airfoil(s) of the gas turbine engine 106, a temperature within the gas turbine engine 106, a pressure within the gas turbine engine 106, etc.). In some examples, the engine parameters 422 can be accessed from one or more sensors associated with the gas turbine engine 106. Additionally or alternatively, the engine parameters 422 can be input by a user of the aircraft 100. The fuel system parameters 424 are parameters related to the fuel distribution system 102. For example, the fuel system parameters 424 can include the pressure(s) at one or more locations in the fuel distribution system 102 and/or the flow rate of hydrogen through the fuel distribution system 102 into the gas turbine engine 106. In some examples, the engine parameters 422 can be accessed from one or more sensors associated with the fuel distribution system 102 and/or the gas turbine engine 106 (e.g., the fuel line sensor 226, etc.).

In the illustrated example of FIG. 4, the fuel distribution controller circuitry 108 accesses the relationship(s) 412A, 412B, 414, 416 stored in the memory 402, the operational parameters 406, the hydrogen concentration sensor outputs 408, and the fire detector output 410 to detect leaks in the fuel distribution system 102 of FIG. 1. In the illustrated example of FIG. 4, the fuel distribution controller circuitry 108 generates example predicted hydrogen concentrations at block 426, example predicted pressures and temperatures at the LOIs at block 428, predicted LFLs at the LOIs at block 430, predicted LDLs at the LOIs at block 432, and an example system recommendation at block 434. An example implementation of the fuel distribution controller circuitry 108 is described in further detail below in conjunction with FIG. 6. Operations to implement the fuel distribution controller circuitry 108 in accordance with the leak detection system 400 of FIG. 4 are described below in conjunction with FIGS. 7 and 8.

At block 426, the fuel distribution controller circuitry 108 generates the predicted hydrogen concentrations based on the hydrogen concentration sensor outputs 408 and the fourth relationship(s) 416. For example, the fuel distribution controller circuitry 108 can determine the predicted hydrogen concentrations by inputting the hydrogen concentration sensor outputs 408 into the fourth relationship(s) 416. In some such examples, the fuel distribution controller circuitry 108 can determine (e.g., predict, etc.) the hydrogen concentration at each of the locations of interest of the undercowl 212 (e.g., the first LOI 304A, the second LOI 304B, the third LOI 304C, etc.).

At block 428, The fuel distribution controller circuitry 108 generates the predicted pressures and temperatures at the LOIs based on the operational parameters 406 and the third relationship(s) 414. For example, the fuel distribution controller circuitry 108 can determine the predicted pressures and temperatures at the LOIs by inputting the operational parameters (e.g., the mission phase parameter 418, the engine parameters 422, etc.) into the third relationship(s) 414. In some such examples, the fuel distribution controller circuitry 108 can determine (e.g., predict, etc.) the temperature, pressure, and/or flow rate of air at each of the locations of interest of the undercowl 212 (e.g., the first LOI 304A, the second LOI 304B, the third LOI 304C, etc.).

At block 430, The fuel distribution controller circuitry 108 generates the predicted LFLs at the LOIs 4 based on the first relationship(s) 412A and the predicted pressures and temperatures at the LOIs determined at 428. For example, the fuel distribution controller circuitry 108 can determine the LFL at each of the locations of interest by inputting on the predicted temperature and pressure at the LOIs, determined at block 428, into the first relationship(s) 412A. In some such examples, the fuel distribution controller circuitry 108 can determine the hydrogen concentration associated with the LFL for each of LOIs of the undercowl 212 (e.g., the first LOI 304A, the second LOI 304B, the third LOI 304C, etc.). The fuel distribution controller circuitry 108 generates the predicted LDLs at the LOIs at block 432 based on the second relationship(s) 412B and the predicted pressures and temperatures at the LOIs determined at block 428. For example, the fuel distribution controller circuitry 108 can determine the LDL at each of the locations of interest by inputting the predicted temperature and pressure at the LOIs determined at block 428 into the second relationship(s) 412B. In some such examples, the fuel distribution controller circuitry 108 can determine the hydrogen concentration associated with the LDL for each of the LOIs of the undercowl 212 (e.g., the first LOI 304A, the second LOI 304B, the third LOI 304C, etc.).

At block 434, The fuel distribution controller circuitry 108 generates the system recommendation based on the predicted LFLs at the LOIs, determined at block 430, the predicted LDLs at the LOIs, the predicted hydrogen concentrations, determined at block 426, and the fire detector output 410. For example, the fuel distribution controller circuitry 108 can compare the predicted LFLs at the LOIs, determined at block 430, and predicted hydrogen concentrations, determined at block 426, to determine if the LFL and/or LDL at any of the LOIs within the undercowl 212. An example table depicting this comparison is presented below:

TABLE 3

Comparison of Predicted Hydrogen Concentration to Hydrogen LFL during Takeoff at Locations of Interest

| Location of Interest | H2 LFL (% Volume) | Predicted H2 Concentration (% Volume) | Safety Ratio |
|---|---|---|---|
| LOI 1 | 5.153 | 3.342 | 0.65 |
| LOI 2 | 4.957 | 2.69 | 0.54 |

TABLE 3-continued

Comparison of Predicted Hydrogen Concentration to Hydrogen LFL during Takeoff at Locations of Interest

| Location of Interest | H2 LFL (% Volume) | Predicted H2 Concentration (% Volume) | Safety Ratio |
|---|---|---|---|
| LOI 3 | 4.760 | 4.91 | 1.03 |
| . | . | . | . |
| . | . | . | . |
| . | . | . | . |

In Table 3, the first column represents the location of interest (e.g., the LOIs 304A, 304B, 304C, etc.), the second column represents the LFL of hydrogen by percentage by volume (e.g., predicted LFLs at the LOIs determined at block 430, etc.), the third column represents the predicted hydrogen concentrations determined at 426 for each of the LOI, and the fourth column represents the ratio of the third column to the second column, the safety ratio. In some examples, when the fuel distribution controller circuitry 108 determines the safety ratio at an LOI is greater than 1 (e.g., the predicted hydrogen concentration is greater than the H2 LFL at the LOI), the fuel distribution controller circuitry 108 can determine there is a fire a risk in the undercowl. It should be appreciated that a similar comparison can be done to determine if the hydrogen concentration exceeds the H2 LDL at each LOI.

The fuel distribution controller circuitry 108 can generate the system recommendation including an indication (e.g., a command, a recommendation, a warning, etc.) to active a fire suppression system of the gas turbine engine 106 and/or disable the fuel distribution system 102 when the fire detector output 410 includes an indication that a fire is present in the undercowl 212. In some examples, the fuel distribution controller circuitry 108 can generate the system recommendation including an indication to disable the fuel distribution system 102 and/or to release a frangible panel system of the undercowl 212 when the hydrogen concentration at a location of interest exceeds the LDL at that location of interest. In some examples, the fuel distribution controller circuitry 108 can generate the system recommendation including an indication to increase a rate of ventilation within the undercowl 212, reduce a pressure of fuel in the fuel distribution system 102, and/or disable the fuel distribution system 102 when the hydrogen concentration at a location of interest exceeds the LFL at that location of interest. Example operations for generating the system recommendation are described below in conjunction with FIG. 10.

Figure 5:
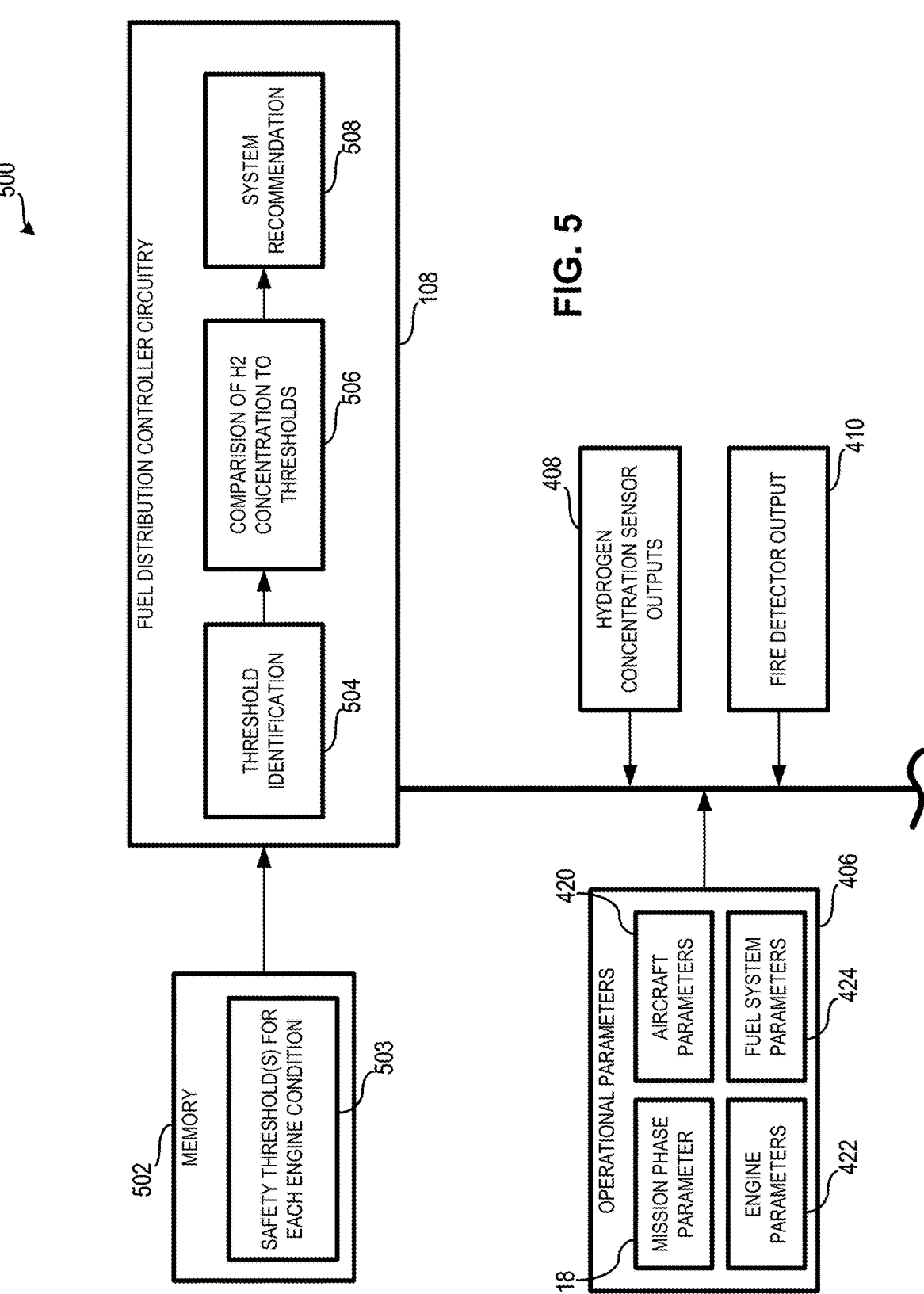
FIG. 5 is a block diagram of an example second leak detection system including example fuel distribution controller circuitry implemented in accordance with the teachings of this disclosure.

FIG. 5 is a block diagram of another example leak detection system 500 implemented in accordance with the teachings of this disclosure. The second leak detection system 500 includes example memory 502 and the fuel distribution controller circuitry 108 of FIG. 4. In the illustrated example of FIG. 5, the fuel distribution controller circuitry 108 receives the operational parameters 406 of FIG. 4 (e.g., the mission phase parameter 418 of FIG. 4, the aircraft parameters 420 of FIG. 4, the engine parameters 422 of FIG. 4, and the fuel system parameters 424 of FIG. 4, etc.), the hydrogen concentration sensor outputs 408 of FIG. 4, and the fire detector output 410 of FIG. 4. The example memory 502 of FIG. 5 is similar to the example memory 402 of FIG. 4, except that the memory 502 includes a plurality of safety threshold(s) 503 and does not include the relationships stored in the memory 402.

The plurality of safety threshold(s) 503 are stored in the memory 502. The plurality of safety threshold(s) 503 correspond to the LFL and/or LDL hydrogen concentration(s) at the location of each of the hydrogen concentration sensors in the undercowl 212 (e.g., the hydrogen concentration sensors 220, 222, 224, etc.) in one or more engine conditions. For example, the plurality of safety threshold(s) 503 can include a threshold for each of the hydrogen concentration sensors in each of the mission phases (e.g., a first safety threshold for the first hydrogen concentration sensor 220 during cruise, a second safety threshold for the first hydrogen concentration sensor 220 during takeoff, a third safety threshold for the second hydrogen concentration sensor 222 during ground idle, a fourth safety threshold for the second hydrogen concentration sensor 222 during takeoff, etc.). Additionally or alternatively, the plurality of safety threshold(s) 503 can include a threshold for each hydrogen concentration sensor for other engine conditions (e.g., engine speed, altitude, etc.). In some examples, the plurality of safety threshold(s) 503 can be determined empirically, analytically, and/or via simulation. In some such examples, the plurality of safety threshold(s) 503 can be based on the LDL and/or the LFL at the expected temperature and/or pressure at the location of the hydrogen concentration sensors 220, 222, 224 during the corresponding engine condition, etc. In some examples, a safety margin can be applied to some or all of the plurality of safety threshold(s) 503 (e.g., a safety margin between 1.5 and 3, etc.). An example table depicting example values for the plurality of safety threshold(s) 503 is presented below:

TABLE 4

| Comparison of Predicted Hydrogen Concentration to Hydrogen LFL at a Ground Idle at Sensor Locations | | | |
|---|---|---|---|
| Sensor Location | H2 Threshold (% Volume) at Takeoff | H2 Threshold (% Volume) at Ground Idle | H2 Threshold (% Volume) at Cruise |
| M1 | 0.7780 | 0.195 | 0.4460 |
| M2 | 0.8266 | 0.223 | 0.4739 |
| M3 | 0.9725 | 0.344 | 0.5575 |
| . | . | . | . |
| . | . | . | . |
| . | . | . | . |

In Table 4, the first column represents the location of the sensors (e.g., the hydrogen concentration sensors 220, 222, 224, etc.) within the undercowl 212, the second column represents the hydrogen concentration thresholds determined during the threshold identification at block 504 for each sensor location at ground idle, the third column represents the hydrogen concentration thresholds determined during the threshold identification at block 504 for each sensor location at takeoff, and the fourth column represents the hydrogen concentration thresholds determined during the threshold identification at block 504 for each sensor location at cruise. It should be appreciated similar threshold can be determined for the LDL at each of this sensor location.

In the illustrated example of FIG. 5, the fuel distribution controller circuitry 108 accesses the plurality of safety threshold(s) 503 stored in the memory 502, the operational parameters 406, and the hydrogen concentration sensor outputs 408, and the fire detector output 410 to detect leaks in the fuel distribution system 102 of FIG. 1. In the illustrated example of FIG. 5, the fuel distribution controller circuitry 108 conducts threshold identification at block 504 and comparison of hydrogen concentrations with the identified thresholds at block 506. After the comparison of hydrogen concentrations with the identified thresholds at block 506, the fuel distribution controller circuitry 108 outputs an example system recommendation at block 508. Operations to implement the fuel distribution controller circuitry 108 in accordance with the leak detection system 500 of FIG. 5 are described below in conjunction with FIGS. 7 and 9.

At block 504, during the threshold identification, the fuel distribution controller circuitry 108 determines which thresholds to compare the hydrogen concentration sensor outputs 408 based on the operational parameters 406. For example, if the plurality of safety threshold(s) 503 were generated based on the mission phase, the fuel distribution controller circuitry 108 can identify which of the plurality of safety threshold(s) 503 to use based on the mission phase parameter 418. In other examples, based on the how the plurality of safety threshold(s) 503 were generated, the fuel distribution controller circuitry 108 can determine which of the plurality of safety threshold(s) 503 to use based on other ones of the operational parameters 406. In some examples, if the mission phase is not known, the fuel distribution controller circuitry 108 can select the lowest of the plurality of safety threshold(s) 503 for each sensor location.

At block 506, during the comparison of hydrogen concentrations with the identified thresholds, the fuel distribution controller circuitry 108 compares the hydrogen concentration sensor outputs 408 to the corresponding ones of the plurality of the safety threshold(s) 503 identified by during the threshold identification at block 504. In some examples, the fuel distribution controller circuitry 108 can determine when the outputs of any of the hydrogen concentrations exceed corresponding ones of the identified plurality of the safety threshold(s) 503 (e.g., when the output of the first hydrogen concentration sensor 220 exceeds a corresponding LFL safety threshold, when the output of the first hydrogen concentration sensor 220 exceeds a corresponding LDL safety threshold, etc.). An example table depicting example this comparison is presented below:

TABLE 5

| Comparison of Predicted Hydrogen Concentration to Hydrogen LFL at a Ground Idle at Sensor Locations | | | |
|---|---|---|---|
| Sensor Location | H2 Threshold (% Volume) | Measured H2 Concentration (% Volume) | Safety Ratio |
| M1 | 0.195 | 0.150 | 0.77 |
| M2 | 0.223 | 0.202 | 0.91 |
| M3 | 0.344 | 0.378 | 1.10 |
| . | . | . | . |
| . | . | . | . |
| . | . | . | . |

In Table 5, the first column represents the location of the sensors (e.g., the hydrogen concentration sensors 220, 222, 224, etc.) within the undercowl 212, the second column represents the hydrogen concentration thresholds determined during the threshold identification at block 504 for each sensor location, the third column represents the hydrogen concentration sensor outputs 408 at the sensor locations, and the fourth column represents the ratio of the third column to the second column, the safety ratio. In some examples, when the fuel distribution controller circuitry 108 determines the safety ratio at a sensor is greater than 1 (e.g., the measured hydrogen concentration is greater than the threshold at the location), the fuel distribution controller circuitry 108 can determine there is a fire a risk in the undercowl. It should be appreciated that a similar comparison can be done to determine if the hydrogen concentration poses a detonation risk at the sensor location.

At block 508, the fuel distribution controller circuitry 108 generates a system recommendation based on the comparison of hydrogen concentrations with the identified thresholds determined at block 506 and the fire detector output 410. For example, the fuel distribution controller circuitry 108 can generate the system recommendation including an indication (e.g., a command, a recommendation, a warning, etc.) to activate a fire suppression system of the gas turbine engine 106 and/or disable the fuel distribution system 102 when the fire detector output 410 includes an indication that a fire is present in the undercowl 212. In some examples, the fuel distribution controller circuitry 108 can generate the system recommendation including an indication to disable the fuel distribution system 102 and/or to release a frangible panel system of the undercowl 212 when the output of one of the hydrogen concentration sensors exceeds one of the plurality of safety threshold(s) 503 corresponding to the LDL at a location of a hydrogen concentration sensor. In some examples, the fuel distribution controller circuitry 108 can generate the system recommendation including an indication to increase a rate of ventilation within the undercowl 212, reduce a pressure of fuel in the fuel distribution system 102, and/or disable the fuel distribution system 102 when the output of one of the hydrogen concentration sensors exceeds one of the plurality of safety threshold(s) 503 corresponding to the LFL at a location of a hydrogen concentration sensor. Example operations for generating the system recommendation are described below in conjunction with FIG. 10.

Figure 6:
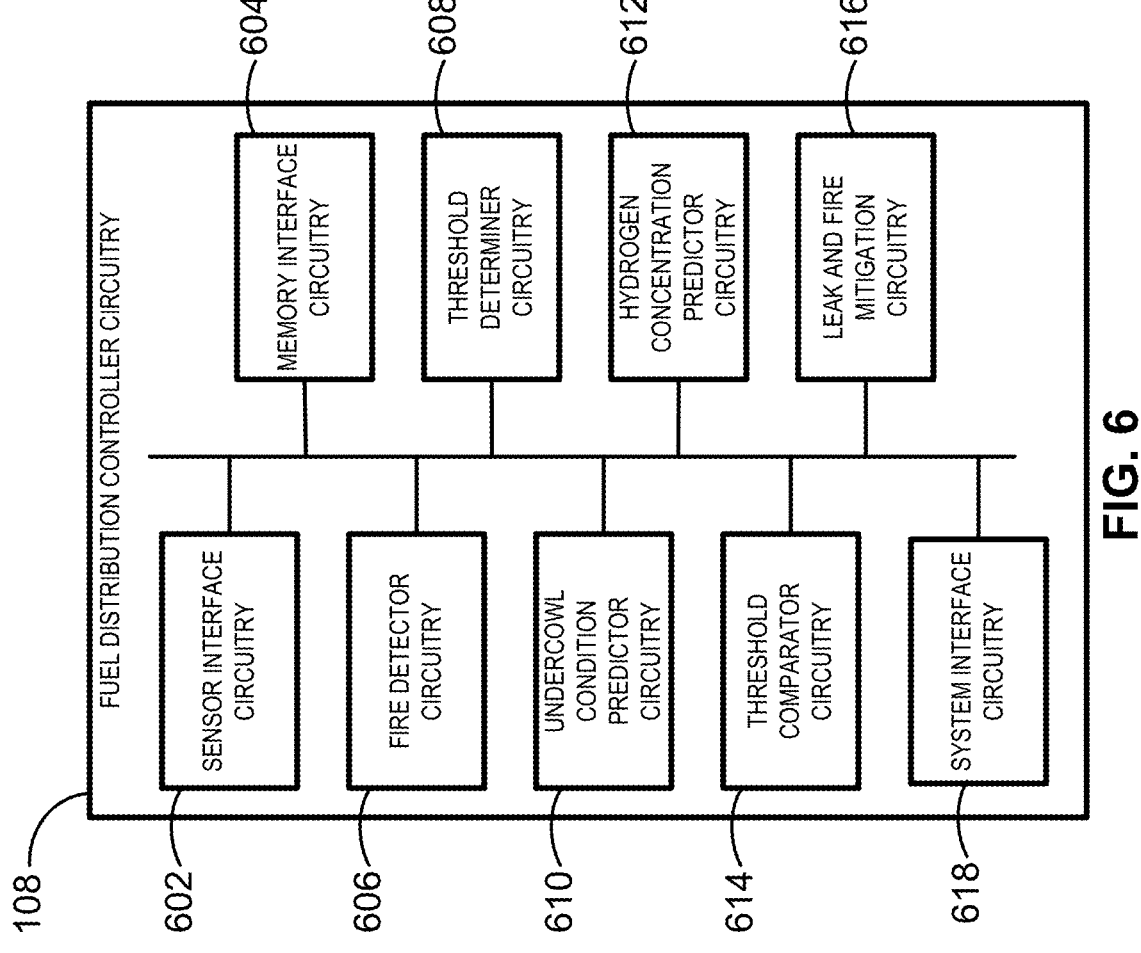
FIG. 6 is a block diagram of the fuel distribution controller circuitry of FIGS. 4 and 5.

FIG. 6 is a block diagram of an example implementation of the fuel distribution controller circuitry 108 of FIGS. 4 and 5 to detect and mitigate leaks and/or fire in a hydrogen fuel distribution system. In the illustrated example of FIG. 6, the fuel distribution controller circuitry 108 includes example sensor interface circuitry 602, example memory interface circuitry 604, example fire detector circuitry 606, example threshold determiner circuitry 608, example undercowl condition predictor circuitry 610, example hydrogen concentration predictor circuitry 612, example threshold comparator circuitry 614, example leak and fire mitigation circuitry 616, and example system interface circuitry 618. The example implementation of the fuel distribution controller circuitry 108 can be used in conjunction with the leak detection system 400 of FIG. 4 and/or the leak detection system 500 of FIG. 5.

The fuel distribution controller circuitry 108 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the fuel distribution controller circuitry 108 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware.

Moreover, in some examples, some or all of the circuitry of FIGS. 1, and/or 4-6 may be implemented by microprocessor circuitry executing instructions and/or FPGA circuitry performing operations to implement one or more virtual machines and/or containers.

The sensor interface circuitry 602 accesses sensor data from the sensors of the aircraft 100, the fuel distribution system 102, and/or the gas turbine engine 106 of FIG. 1. For example, the sensor interface circuitry 602 can access sensor outputs from the hydrogen concentration sensors 220, 222, 224 (e.g., the hydrogen concentration sensor outputs 408 of FIGS. 4 and 5, etc.) and/or the fire detection system 306 (e.g., the fire detector output 410 of FIGS. 4 and 5, etc.). In some examples, the sensor interface circuitry 602 can access (e.g., retrieve, query, receive, etc.) outputs from other sensors of the aircraft 100, the fuel distribution system 102, and/or the gas turbine engine 106. In some such examples, some or all of the operational parameters 406 of FIGS. 4 and 5 can be determined based on sensor outputs accessed by the sensor interface circuitry 602. In some examples, the sensor interface circuitry 602 can transform the received sensor data from a machine-readable format to a human-readable format (e.g., a string, a floating-point number, an integer, etc.). In some examples, the sensor interface circuitry 602 is instantiated by programmable circuitry executing sensor interface circuitry instructions and/or configured to perform operations such as those represented by the flowchart(s) of FIGS. 7-10.

In some examples, the fuel distribution controller circuitry 108 includes means for interfacing with a sensor. For example, the means for interfacing with a sensor may be implemented by the sensor interface circuitry 602. In some examples, the sensor interface circuitry 602 may be instantiated by programmable circuitry such as the example programmable circuitry 1112 of FIG. 11. Additionally or alternatively, the sensor interface circuitry 602 may be instantiated by any other combination of hardware, software, and/or firmware. For example, the sensor interface circuitry 602 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The memory interface circuitry 604 interfaces with memory associated with the aircraft 100, the fuel distribution system 102, and/or the gas turbine engine 106. For example, the memory interface circuitry 604 can access the relationship(s) 412A, 412B, 414, 416 from the memory 402 of FIG. 4. For example, the memory interface circuitry 604 can access the safety threshold(s) 503 from the memory 502 of FIG. 5. In some examples, the memory interface circuitry 604 can create a flag (e.g., a warning, an indication, a data structure, etc.) in the memory 402 of FIG. 4 and/or the memory 502 indicative of the presence of a leak in the fuel distribution system 102 and/or within the undercowl 212. In some examples, the memory interface circuitry 604 is instantiated by programmable circuitry executing memory interface circuitry instructions and/or configured to perform operations such as those represented by the flowchart(s) of FIG. 7-10.

In some examples, the fuel distribution controller circuitry 108 includes means for interfacing with a memory. For example, the means for determining may be implemented by the memory interface circuitry 604. In some examples, the memory interface circuitry 604 may be instantiated by programmable circuitry such as the example programmable circuitry 1112 of FIG. 11. Additionally or alternatively, the memory interface circuitry 604 may be instantiated by any other combination of hardware, software, and/or firmware. For example, the memory interface circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The fire detector circuitry 606 determines if a fire is detected in the undercowl 212 and/or the fuel distribution system 102. For example, the fire detector circuitry 606 can interface with the fire detection system 306 to determine if a fire is present in the undercowl 212 and/or the fuel distribution system 102. In some examples, the fire detector circuitry 606 can determine if a fire is present in the system based on the fire detector output 410. In some examples, the fire detector circuitry 606 can determine the location of the fire within the undercowl 212 (e.g., at one of the hydrogen concentration sensors 220, 222, 224, at one of the LOIs 304A, 304B, 304C, etc.). In some examples, the fire detector circuitry 606 is instantiated by programmable circuitry executing fire detector instructions and/or configured to perform operations such as those represented by the flow-chart(s) of FIG. 7-10.

In some examples, the fuel distribution controller circuitry 108 includes means for detecting a fire. For example, the means for determining may be implemented by fire detector circuitry 606. In some examples, the fire detector circuitry 606 may be instantiated by programmable circuitry such as the example programmable circuitry 1112 of FIG. 11. Additionally or alternatively, the fire detector circuitry 606 may be instantiated by any other combination of hardware, software, and/or firmware. For example, the fire detector circuitry 606 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The threshold determiner circuitry 608 determines hydrogen concentration thresholds for the undercowl 212. For example, the threshold determiner circuitry 608 can determine a threshold for the undercowl 212 based on the LFL and/or LDL of hydrogen and/or the current condition of the undercowl 212 (e.g., the current temperature distribution of the undercowl 212, the current pressure of the undercowl 212, etc.). In some examples, for the leak detection system 400 of FIG. 4, the threshold determiner circuitry 608 can determine the LDL and/or LFL for each LOI within the undercowl 212 based on the temperature and/or pressure at that LOI and the relationship(s) 412A, 412B of FIG. 4, respectively. In some such examples, if the relationship(s) 412A, 412B are lookup tables, the threshold determiner circuitry 608 can determine the LDL and LFL for each location of interest by inputting the temperature and/or pressure at the location of interest into a look-up table. In some examples, for the leak detection system 500 of FIG. 5, the threshold determiner circuitry 608 can determine thresholds for the location(s) of each of the hydrogen concentration sensors 220, 222, 224 based on the operational parameters 406. In some such examples, each sensor location can have an associated threshold for the LDL and an associated threshold for the LFL for each mission phase. Additionally or alternatively, the threshold determiner circuitry 608 can determine threshold(s) for each location (e.g., each sensor location and/or each location of interest, etc.) based on any other ones of the operational parameters 406. In some examples, the threshold determiner circuitry 608 is instantiated by programmable circuitry executing threshold determiner instructions and/or configured to perform operations such as those represented by the flowchart(s) of FIG. 7-10.

In some examples, the fuel distribution controller circuitry 108 includes means for determining a threshold. For example, the means for determining a threshold may be implemented by the threshold determiner circuitry 608. In some examples, the threshold determiner circuitry 608 may be instantiated by programmable circuitry such as the example programmable circuitry 1112 of FIG. 11. Additionally or alternatively, the threshold determiner circuitry 608 may be instantiated by any other combination of hardware, software, and/or firmware. For example, the threshold determiner circuitry 608 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The undercowl condition predictor circuitry 610 determines the condition of the undercowl 212. For example, the undercowl condition predictor circuitry 610 can determine the temperature, pressure, and/or flow rate within the undercowl 212 of the gas turbine engine 106. For example, the undercowl condition predictor circuitry 610 can determine the condition of the undercowl 212 based on one or more of the operational parameters 406. In some examples, the undercowl condition predictor circuitry 610 can determine the condition of the undercowl based on the mission phase parameter 418 (e.g., a first temperature, first pressure, and first flow rate for cruise, a second temperature, second pressure, and second flow rate for takeoff, etc.)

Additionally or alternatively, the undercowl condition predictor circuitry 610 can determine the condition within the undercowl based on other ones of the operational parameters 406 (e.g., engine speed, throttle position, ambient conditions of the aircraft 100, etc.). In some examples, the undercowl condition predictor circuitry 610 can determine the condition(s) of the undercowl 212 via the third relationship(s) 414 of FIG. 4. In other examples, the undercowl condition predictor circuitry 610 can determine the condition(s) of the undercowl 212 analytically (e.g., mathematically, via flow principles, etc.) and/or via modeling.

In some examples, the undercowl condition predictor circuitry 610 can determine the temperature, pressure, and/or flow rate at discrete locations within the undercowl 212 (e.g., the LOIs 304A, 304B, 304C, the locations of the hydrogen concentration sensor 220, 222, 224, etc.). Additionally or alternatively, the undercowl condition predictor circuitry 610 can generate a temperature map of the under-cowl 212, a pressure map of the undercowl 212, and/or a flow rate map within the undercowl 212. In some examples, the undercowl condition predictor circuitry 610 is instanti-ated by programmable circuitry executing undercowl con-dition predictor instructions and/or configured to perform operations such as those represented by the flowchart(s) of FIG. 7-10.

In some examples, the fuel distribution controller cir-cuitry 108 includes means for determining the condition of an undercowl and/or means for determining a condition of a gas turbine engine. For example, the means for determining may be implemented by the undercowl condition predictor circuitry 610. In some examples, the undercowl condition predictor circuitry 610 may be instantiated by programmable circuitry such as the example programmable circuitry 1112 of FIG. 11. Additionally or alternatively, the undercowl condition predictor circuitry 610 may be instantiated by any other combination of hardware, software, and/or firmware. For example, the undercowl condition predictor circuitry 610 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firm-ware, but other structures are likewise appropriate.

The hydrogen concentration predictor circuitry 612 deter-mines the hydrogen concentration(s) within the undercowl 212. For example, the hydrogen concentration predictor circuitry 612 can determine the hydrogen concentration(s) within the undercowl 212 based on the hydrogen concen-tration sensor outputs 408 (e.g., based on an output of one or more of the hydrogen concentration sensors 220, 222, 224, etc.). In some examples, the hydrogen concentration predictor circuitry 612 can determine the hydrogen concen-tration(s) within the undercowl 212 based on the fourth relationship(s) 416. Additionally or alternatively, the hydro-gen concentration predictor circuitry 612 can determine the hydrogen concentration(s) within the undercowl 212 ana-lytically (e.g., via mathematics, flow principles, etc.) and/or via modeling. In some examples, the hydrogen concentra-tion predictor circuitry 612 can determine the hydrogen concentration(s) rate at discrete locations within the under-cowl 212 (e.g., the LOIs 304A, 304B, 304C, etc.). Addi-tionally or alternatively, the undercowl condition predictor circuitry 610 can generate a hydrogen concentration map of the undercowl 212 (e.g., similar to the hydrogen distribution 302 of FIG. 3, etc.). In some examples, the undercowl condition predictor circuitry 610 can use the generated hydrogen concentration to identify a location of the leak within the undercowl. For example, if the hydrogen distri-bution 302 of FIG. 3 is generated by the hydrogen concen-tration predictor circuitry 612, the hydrogen concentration predictor circuitry 612 can identify the location of the leak 300 as the first LOI 304A. In some examples, the hydrogen concentration predictor circuitry 612 is instantiated by pro-grammable circuitry executing hydrogen concentration pre-dictor instructions and/or configured to perform operations such as those represented by the flowchart(s) of FIGS. 7-10.

In some examples, the fuel distribution controller cir-cuitry 108 includes means for determining a hydrogen concentration. For example, the means for determining may be implemented by the hydrogen concentration predictor circuitry 612. In some examples, the hydrogen concentration predictor circuitry 612 may be instantiated by programmable circuitry such as the example programmable circuitry 1112 of FIG. 11. Additionally or alternatively, the hydrogen concentration predictor circuitry 612 may be instantiated by any other combination of hardware, software, and/or firm-ware. For example, the hydrogen concentration predictor circuitry 612 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations correspond-ing to the machine readable instructions without executing software or firmware, but other structures are likewise appropriate.

The threshold comparator circuitry 614 compares the hydrogen concentrations at one or more locations within the undercowl 212 (e.g., a location of one or more of the hydrogen concentration sensors 220, 222, 224, one or more of the LOIs 304A, 304B, 304C, etc.) to a threshold deter-mined by the threshold determiner circuitry 608. The thresh-old comparator circuitry 614 determines when the hydrogen concentrations at one or more locations within the under-cowl 212 exceed the LFL and/or LDL associated with that location. In some examples, the threshold comparator cir-cuitry 614 can compare the predicted hydrogen concentra-tion at a location of interest (e.g., one of the LOIs 304A, 304B, 304C, etc.) to the LDL and/or LFL determined by the threshold determiner circuitry 608 for that location of inter-est. For example, the threshold comparator circuitry 614 can determine when one of the hydrogen concentration sensor outputs 408 associated with a corresponding one of the hydrogen concentration sensor exceeds a LFL threshold or an LDL threshold associated with the hydrogen concentra-tion sensor. For example, the threshold comparator circuitry 614 can compare the output of the selected hydrogen con-centration sensor to the applicable safety threshold (e.g., one of the safety threshold(s) 503 of FIG. 5, etc.). In some examples, the threshold comparator circuitry 614 is instan-tiated by programmable circuitry executing threshold com-parator instructions and/or configured to perform operations such as those represented by the flowchart(s) of FIGS. 7-10.

In some examples, the fuel distribution controller cir-cuitry includes means for comparing a hydrogen concentra-tion to a threshold. For example, the means for determining may be implemented by the threshold comparator circuitry 614. In some examples, the threshold comparator circuitry 614 may be instantiated by programmable circuitry such as the example programmable circuitry 1112 of FIG. 11. Addi-tionally or alternatively, the threshold comparator circuitry 614 may be instantiated by any other combination of hard-ware, software, and/or firmware. For example, the threshold comparator circuitry 614 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The leak and fire mitigation circuitry 616 determines one or more mitigation actions based on a detected leak, a detected fire, a detected detonation risk, and/or a detected fire risk within the undercowl 212. For example, the leak and fire mitigation circuitry 616 can determine (e.g., generate a command, generate instructions, set a flag, etc.) to activate the fire suppression system 308 of FIG. 3, to change a pressure of hydrogen fuel within the fuel distribution system 102, to change a ventilation rate of the ventilation system 310 of FIG. 3, to release frangible panels of the core frame 204, etc. In some examples, the leak and fire mitigation circuitry 616 can determine which mitigation operations to take based on the output of the threshold comparator circuitry 614. In some such examples, the leak and fire mitigation circuitry 616 can access memory (e.g., the memory 402 of FIG. 4, the memory 502 of FIG. 5, etc.) to determine when a flag has been set indicating that there is a detected fire risk and/or a detected detonation risk within the undercowl 212. In some examples, the leak and fire mitigation circuitry 616 is instantiated by programmable circuitry executing leak and fire mitigation instructions and/or configured to perform operations such as those represented by the flowchart(s) of FIGS. 7-10.

In some examples, the fuel distribution controller circuitry 108 includes means for mitigating a detected fire and/or a detected leak. For example, the means for mitigating a detected fire and/or a detected leak may be implemented by the leak and fire mitigation circuitry 616. In some examples, the leak and fire mitigation circuitry 616 may be instantiated by programmable circuitry such as the example programmable circuitry 1112 of FIG. 11. Additionally or alternatively, the leak and fire mitigation circuitry 616 may be instantiated by any other combination of hardware, software, and/or firmware. For example, the leak and fire mitigation circuitry 616 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The system interface circuitry 618 interfaces with the fuel distribution system 102, the fire suppression system 308, the ventilation system 310, and/or other systems of the aircraft and/or gas turbine engine 106. For example, the system interface circuitry 618 can, in response to a command from the leak and fire mitigation circuitry 616, activate the fire suppression system 308 of FIG. 3, change a pressure of hydrogen fuel within the fuel distribution system 102, change a ventilation rate of the ventilation system 310 of FIG. 3, and/or release frangible panels of the core frame 204. In some examples, the system interface circuitry 618 is instantiated by programmable circuitry executing system interface instructions and/or configured to perform operations such as those represented by the flowchart(s) of FIGS. 7-10.

In some examples, the fuel distribution controller circuitry includes means for a system of a gas turbine engine. For example, the means for a system of a gas turbine engine may be implemented by the system interface circuitry 618. In some examples, the system interface circuitry 618 may be instantiated by programmable circuitry such as the example programmable circuitry 1112 of FIG. 11. Additionally or alternatively, the system interface circuitry 618 may be instantiated by any other combination of hardware, software, and/or firmware. For example, the system interface circuitry 618 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the fuel distribution controller circuitry of FIG. 1 is illustrated in FIG. 6, one or more of the elements, processes, and/or devices illustrated in FIG. 6 may be combined, divided, re-arranged, omitted, eliminated, and/or implemented in any other way. Further, the example sensor interface circuitry 602, the example memory interface circuitry 604, the example fire detector circuitry 606, the example threshold determiner circuitry 608, the example undercowl condition predictor circuitry 610, the example hydrogen concentration predictor circuitry 612, the example threshold comparator circuitry 614, the example leak and fire mitigation circuitry 616, the example system interface circuitry 618. and/or, more generally, the example fuel distribution controller circuitry 108 of FIG. 6, may be implemented by hardware alone or by hardware in combination with software and/or firmware. Thus, for example, any of the example sensor interface circuitry 602, the example memory interface circuitry 604, the example fire detector circuitry 606, the example threshold determiner circuitry 608, the example undercowl condition predictor circuitry 610, the example hydrogen concentration predictor circuitry 612, the example threshold comparator circuitry 614, the example leak and fire mitigation circuitry 616, the example system interface circuitry 618, and/or, more generally, the example fuel distribution controller circuitry 108, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example fuel distribution controller circuitry 108 of FIG. 6 may include one or more elements, processes, and/or devices in addition to, or instead of, those illustrated in FIG. 6, and/or may include more than one of any or all of the illustrated elements, processes and devices.

Flowchart(s) representative of example machine readable instructions, which may be executed by programmable circuitry to implement and/or instantiate the fuel distribution controller circuitry 108 of FIG. 6 and/or representative of example operations which may be performed by programmable circuitry to implement and/or instantiate the fuel distribution controller circuitry 108 of FIG. 6, are shown in FIGS. 7-10. The machine readable instructions may be one or more executable programs or portion(s) of one or more executable programs for execution by programmable circuitry such as the programmable circuitry 1112 shown in the example programmable circuitry platform 1100 discussed below in connection with FIG. 11 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7-10, many other methods of implementing the example fuel distribution controller circuitry 108 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-10 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/ or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

In general, the same reference numbers will be used throughout the drawing(s) and accompanying written description to refer to the same or like parts. The figures are not necessarily to scale.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

Figure 7:
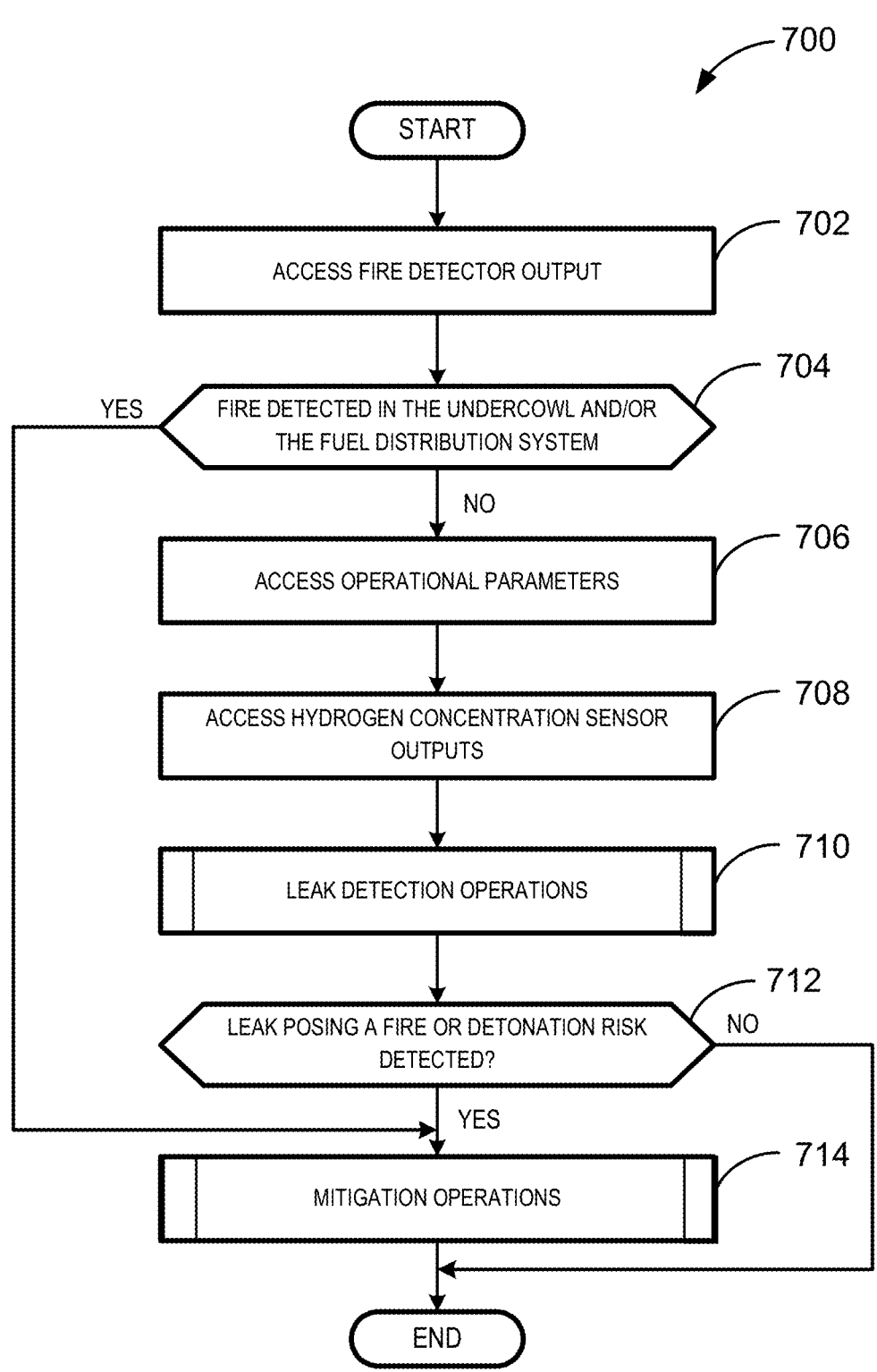
FIGS. 7-10 are flowcharts representative of example machine readable instructions and/or example operations that may be executed, instantiated, and/or performed by example programmable circuitry to implement the fuel distribution controller circuitry of FIG. 6.

FIG. 7 is a flowchart representative of example machine readable instructions and/or example operations 700 that may be executed, instantiated, and/or performed by programmable circuitry to identify a leak and/or fire in the fuel distribution system 102 of FIGS. 1 and 2. The example machine-readable instructions and/or the example operations 700 of FIG. 7 begin at block 702, at which the sensor interface circuitry 602 accesses the fire detector output 410. For example, the sensor interface circuitry 602 can access the fire detector output 410 from the fire detection system 306 of FIG. 3. In some examples, the fire detector output 410 can be a binary output (e.g., "0" for no detected fire in the undercowl 212, "1" for a detected fire in the undercowl 212, etc.). In other examples, the fire detector output 410 can identify the location of a fire within the undercowl 212 (e.g., at a particular LOI of the undercowl 212, etc.). In some examples, the sensor interface circuitry 602 can convert the fire detector output 410 from a machine-readable format to a human-readable format. At block 704, the fire detector circuitry 606 determines when a fire is detected in the undercowl 212 and/or the fuel distribution system 102. For example, the fire detector circuitry 606 can determine when a fire is present in the system based on the fire detector output 410. If the fire detector circuitry 606 determines a fire is present in the undercowl 212 and/or the fuel distribution system 102, the operations 700 advance to block 714. If the fire detector circuitry 606 determines a fire is not present in the undercowl 212 and/or the fuel distribution system 102, the operations 700 advance to block 706.

At block 706, the sensor interface circuitry 602 and/or the memory interface circuitry 604 accesses the operational parameters 406 of FIGS. 4 and 5 (e.g., the mission phase parameter 418, the aircraft parameters 420, the engine parameters 422, the fuel system parameters 424, etc.). For example, the sensor interface circuitry 602 can access some or all of the operational parameters from one or more sensors associated with the aircraft 100 and/or the gas turbine engine 106. In some examples, the sensor interface circuitry 602 can access some or all of the operational parameters 406 from a user interface associated with the aircraft 100 (e.g., an input from a pilot of the aircraft 100, etc.). In other examples, the memory interface circuitry 604 can retrieve some or all of the operational parameters from a memory associated with the fuel distribution system 102 (e.g., the memory 402 of FIG. 4, the memory 502 of FIG. 5, etc.). At block 708, the sensor interface circuitry 602 retrieves the hydrogen concentration sensor outputs 408. For example, the sensor interface circuitry 602 can access the outputs of one or more the hydrogen concentration sensors 220, 222, 224 of FIG. 2. In some examples, the sensor interface circuitry 602 can convert the hydrogen concentration sensor outputs 408 from a machine-readable format to a human-readable format.

At block 710, the fuel distribution controller circuitry 108 conducts leak detection operations. For example, the fuel distribution controller circuitry 108 can conduct leak detect operations via a method associated with the leak detection system 400 of FIG. 4 and/or a method associated with the leak detection system 500 of FIG. 5. Example operations to detect leaks via the leak detection system 400 of FIG. 4 are described below in conjunction with FIG. 8. Example operations to detect leaks via the leak detection system 500 of FIG. 5 are described below in conjunction with FIG. 9.

At block 712, the leak and fire mitigation circuitry 616 determines if a leak posing a fire risk and/or detonation risk was detected in the fuel distribution system 102. For example, the leak and fire mitigation circuitry 616 can determine when a leak is present in the fuel distribution system 102 based on the output of the fuel distribution controller circuitry 108 during the execution of block 710 (e.g., via a flag and/or indicator in memory, etc.). If the leak and fire mitigation circuitry 616 determines a leak posing a fire risk and/or detonation risk is present in the fuel distribution system 102, the operations 700 advance to block 714. If the leak and fire mitigation circuitry 616 determines a leak posing a fire risk and/or detonation risk is not present in the fuel distribution system 102, the operations 700 end. At block 714, the leak and fire mitigation circuitry 616 and the system interface circuitry 618 conduct mitigation operations. Example mitigation operations are described below in conjunction with FIG. 10.

Figure 8:
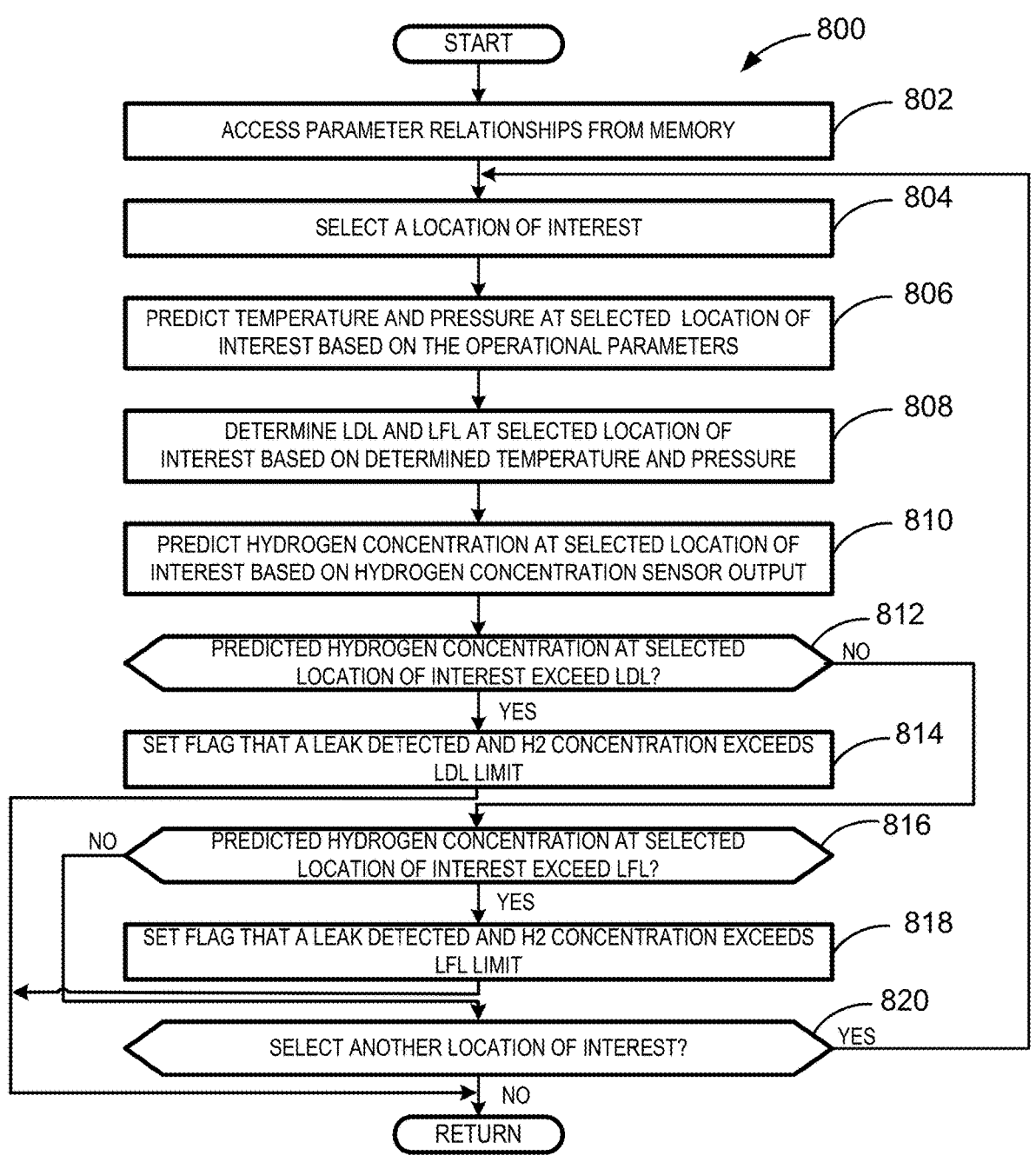

FIG. 8 is a flowchart representative of example machine readable instructions and/or example operations 800 that may be executed, instantiated, and/or performed by programmable circuitry to identify a leak via the leak detection system 400 of FIG. 4 and/or execute block 710 of FIG. 7. The operations 800 begin at block 802, at which the memory interface circuitry 604 accesses parameters relationships from the memory 402. For example, the memory interface circuitry 604 can access (e.g., read, retrieve, request, etc.) one or more the relationship(s) 412A, 412B, 414, 416 from the memory 402. At block 804, the undercowl condition predictor circuitry 610 selects a location of interest within the undercowl 212. For example, the undercowl condition predictor circuitry 610 can select one of the LOIs 304A, 304B, 304C of the undercowl 212 of FIG. 3. In some examples, the undercowl condition predictor circuitry 610 can select the LOIs 304A, 304B, 304C sequentially. Additionally or alternatively, the undercowl condition predictor circuitry 610 can select a previously unselected one of the locations of interests. In some examples, the undercowl condition predictor circuitry 610 can select a previously unselected one of the LOIs 304A, 304B, 304C that has a comparatively great risk of ignition and/or denotation.

At block 806, the undercowl condition predictor circuitry 610 predicts the temperature and pressure at the selected location of interest based on operational parameters 406 and the third relationship(s) 414 (e.g., the relationship between the operational parameters and the undercowl condition, etc.). For example, the undercowl condition predictor circuitry 610 can predict the temperature and pressure at the selected location of interest during the execution of block 804 based on the mission phase parameter 418, the aircraft parameters 420, and/or the engine parameters 422. For example, if the third relationship(s) 414 are look-up table(s), the undercowl condition predictor circuitry 610 can input the operational parameters to determine the temperature and pressure at the selected location of interest. In other examples, the undercowl condition predictor circuitry 610 can use the operational parameters to generate a temperature map and/or pressure map of the undercowl 212.

At block 808, the threshold determiner circuitry 608 determines the LDL and LFL at the selected location of interest based on the temperature and pressure at the selected location of interest. For example, the threshold determiner circuitry 608 can determine the LDL at the selected location of interest based on the first relationship(s) 412A (e.g., the relationship between the LDL and temperature/pressure, etc.) and the determined temperature and pressure. Additionally or alternatively, the threshold determiner circuitry 608 can determine the LFL at the selected location of interest based on the second relationship(s) 412B (e.g., the relationship between the LFL and temperature/pressure, etc.) and the determined temperature and pressure.

At block 810, the hydrogen concentration predictor circuitry 612 predicts the hydrogen concentration at the selected location of interested based on the hydrogen concentration sensor outputs 408. For example, the hydrogen concentration predictor circuitry 612 can determine the hydrogen concentration at the selected location of interest based on the hydrogen concentration sensor outputs 408 and the fourth relationship(s) 416 (e.g. the relationship between the hydrogen concentration sensor outputs 408 and the hydrogen concentration at the location of interest, etc.). In other examples, the hydrogen concentration predictor circuitry 612 can use the hydrogen concentration sensor outputs 408 to generate a hydrogen concentration map (e.g., via flow modeling, analytical, etc.).

At block 812, the threshold comparator circuitry 614 determines if the predicted hydrogen concentration at the selected location of interest exceeds the LDL. For example, the threshold comparator circuitry 614 can compare the predicted hydrogen concentration at the location of interest, determined during the execution of block 810, to the predicted LDL at the selected location of interest, determined during the execution of block 808. In some examples, the threshold comparator circuitry 614 can determine the ratio of the predicted hydrogen concentration to the LDL to determine the safety ratio. In some such examples, if the threshold comparator circuitry 614 determines the safety ratio is greater than one, the threshold comparator circuitry 614 can determine the LDL has been exceeded at that location. If the threshold comparator circuitry 614 determines the predicted hydrogen concentration exceeds the predicted LDL, the operations 800 advance to block 814. If the threshold comparator circuitry 614 determines the predicted hydrogen concentration does not exceed the predicted LDL, the operations 800 advance to block 816.

At block 814, the memory interface circuitry 604 can set a flag that a leak has been detected and the hydrogen concentration at a location of interest exceeds the LDL at the selected location of interest. For example, the memory interface circuitry 604 can set a flag (e.g., an indication, a warning, a notification, a data structure, etc.) in the memory 402 that the LDL has been exceeded. In some examples, because the LDL of hydrogen is greater in all flow conditions that the LFL of hydrogen, the memory interface circuitry 604 can set a flag that the LFL at the location of interest has also been exceeded.

At block 816, the threshold comparator circuitry 614 determines if the predicted hydrogen concentration at the selected location of interest exceeds the LFL. For example, the threshold comparator circuitry 614 can compare the predicted hydrogen concentration at the location interest, determined during the execution of block 810, to the predicted LFL at the selected location of interest, determined during the execution of block 808. In some examples, the threshold comparator circuitry 614 can determine the ratio of the predicted hydrogen concentration to the LFL to determine the safety ratio. In some such examples, if the threshold comparator circuitry 614 determines the safety ratio is greater than one, the threshold comparator circuitry 614 can determine the LFL has been exceeded at that location. If the threshold comparator circuitry 614 determines the predicted hydrogen concentration exceeds the predicted LFL, the operations 800 advance to block 818. If the threshold comparator circuitry 614 determines the predicted hydrogen concentration does not exceed the predicted LFL, the operations 800 advance to block 820.

At block 818, the memory interface circuitry 604 can set a flag that a leak has been detected and the hydrogen concentration at a location of interest exceeds the LFL at the selected location of interest. For example, the memory interface circuitry 604 can set a flag (e.g., an indication, a warning, a notification, a data structure, etc.) in the memory 402 that the LFL has been exceeded.

At block 820, the undercowl condition predictor circuitry 610 determines if another location of interest is to be selected. For example, the undercowl condition predictor circuitry 610 can determine another location of interest is to be selected if there are unselected ones of the LOIs 304A, 304B, 304C that have not been analyzed via the execution of blocks 804, 806, 808, 810, 812, 814, 816, 818. Additionally or alternatively, the undercowl condition predictor circuitry 610 can determine to select another location of interest based on the continued operation of the gas turbine engine 106 (e.g., the leak detection system 400 can continuously check for leaks through a mission, etc.). If the undercowl condition predictor circuitry 610 determines another location of interest is to be selected, the operations 800 return to block 804. If the undercowl condition predictor circuitry 610 determines another location of interest is not to be selected, the operations 800 end and/or return to the operations 700 of FIG. 7.

Figure 9:
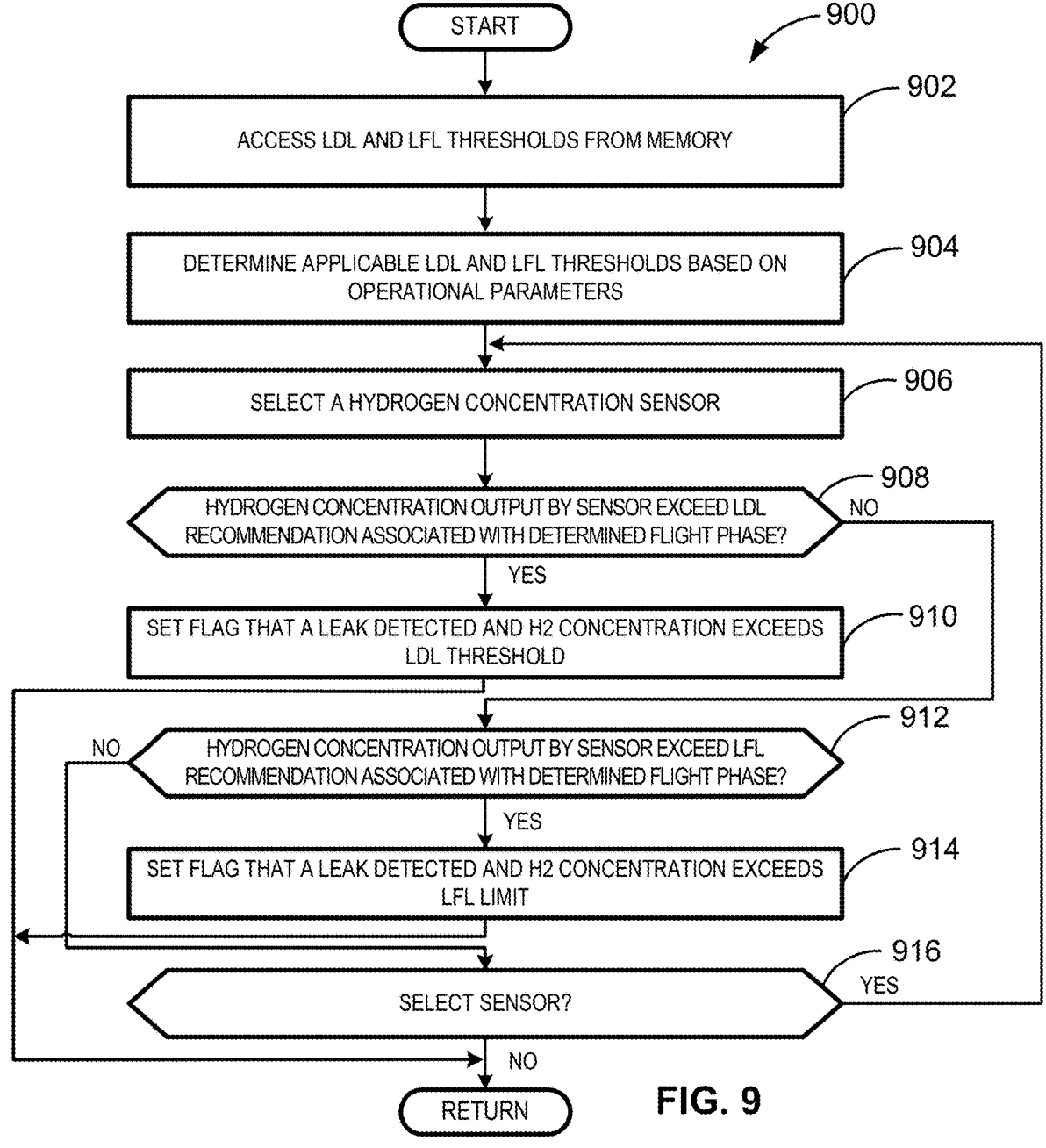

FIG. 9 is a flowchart representative of example machine readable instructions and/or example operations 900 that may be executed, instantiated, and/or performed by programmable circuitry to identify a leak via the leak detection system 500 of FIG. 5 and/or execute block 710 of FIG. 7. The operations 900 begin at block 902, the memory interface circuitry 604 accesses the LDL and LFL thresholds from the memory 502. For example, the memory interface circuitry 604 can access (e.g., read, retrieve, request, etc.) the safety threshold(s) 503 from the memory 502 of FIG. 5. At block 904, the threshold determiner circuitry 608 determines the applicable ones of the safety threshold(s) 503 based on the operational parameters 406. For example, if the safety threshold(s) 503 are divided based on mission phase (e.g., first threshold(s) for each of the hydrogen concentration sensors 220, 222, 224 when the aircraft is in takeoff, a second threshold(s) for each of the hydrogen concentration sensors 220, 222, 224 when the aircraft is in cruise, etc.), the threshold determiner circuitry 608 can determine the applicable thresholds based on the mission phase parameter 418. Additionally or alternatively, if the safety threshold(s) 503 are based on other parameters (e.g., ones of the aircraft parameters 420, ones of the engine parameters 422, ones of the fuel system parameters 424, etc.), the threshold determiner circuitry 608 can determine the applicable ones of the safety threshold(s) 503 based on corresponding ones of the operational parameters 406.

At block 906, the undercowl condition predictor circuitry 610 selects a hydrogen concentration sensor associated with the fuel distribution system 102 and/or within the undercowl 212. For example, the undercowl condition predictor circuitry 610 can select one of the hydrogen concentration sensors 220, 222, 224 of FIG. 2. In some examples, the undercowl condition predictor circuitry 610 can select the hydrogen concentration sensors 220, 222, 224 sequentially. Additionally or alternatively, the undercowl condition predictor circuitry 610 can select a previously unselected one of the hydrogen concentration sensors 220, 222, 224.

At block 908, the threshold comparator circuitry 614 determines if the one of the hydrogen concentration sensor outputs 408 associated with the selected hydrogen concentration sensor exceeds the LDL threshold. For example, the threshold comparator circuitry 614 can compare the output of the selected hydrogen concentration sensor to the applicable safety threshold (e.g., the one of the safety threshold(s) 503 for the selected hydrogen concentration sensor for the LDL, etc.). In some examples, the threshold comparator circuitry 614 can determine the ratio of the measured hydrogen concentration to the threshold associated with LDL the to determine the safety ratio. In some such examples, if the threshold comparator circuitry 614 determines the safety ratio is greater than one, the threshold comparator circuitry 614 can determine the LDL threshold has been exceeded at that location. If the threshold comparator circuitry 614 determines the one of the hydrogen concentration sensor outputs 408 associated with the selected hydrogen concentration sensor exceeds the LDL threshold, the operations 900 advance to block 910. If the threshold comparator circuitry 614 determines the one of the hydrogen concentration sensor outputs 408 associated with the selected hydrogen concentration sensor does not exceed the LDL threshold, the operations 900 advance to block 912.

At block 910, the memory interface circuitry 604 can set a flag that a leak has been detected and the hydrogen concentration at the selected hydrogen concentration sensor exceeds the LDL at the selected location of interest. For example, the memory interface circuitry 604 can set a flag (e.g., an indication, a warning, a notification, a data structure, etc.) in the memory 502 that the LDL has been exceeded at the selected hydrogen concentration sensor.

At block 912, the threshold comparator circuitry 614 determines if the one of the hydrogen concentration sensor outputs 408 associated with the selected hydrogen concentration sensor exceeds the LFL threshold. For example, the threshold comparator circuitry 614 can compare the output of the selected hydrogen concentration sensor to the applicable safety threshold (e.g., the one of the safety threshold(s) 503 for the selected hydrogen concentration sensor for the LFL, etc.). In some examples, the threshold comparator circuitry 614 can determine the ratio of the measured hydrogen concentration to the threshold associated with LFL the to determine the safety ratio. In some such examples, if the threshold comparator circuitry 614 determines the safety ratio is greater than one, the threshold comparator circuitry 614 can determine the LFL threshold has been exceeded at that location. If the threshold comparator circuitry 614 determines the one of the hydrogen concentration sensor outputs 408 associated with the selected hydrogen concentration sensor exceeds the LFL threshold, the operations 900 advance to block 914. If the threshold comparator circuitry 614 determines the one of the hydrogen concentration sensor outputs 408 associated with the selected hydrogen concentration sensor does not exceed the LFL threshold, the operations 900 advance to block 916. At block 914, the memory interface circuitry 604 can set a flag that a leak has been detected and the hydrogen concentration at the selected hydrogen concentration sensor exceeds the LFL at the selected location of interest. For example, the memory interface circuitry 604 can set a flag (e.g., an indication, a warning, a notification, a data structure, etc.) in the memory 502 that the LFL has been exceeded at the selected hydrogen concentration sensor.

At block 916, the sensor interface circuitry 602 determines if another location of interest is to be selected. For example, the sensor interface circuitry 602 can determine to select another location of interest when there are unselected ones of the hydrogen concentration sensors 220, 222, 224 that have not been analyzed via the execution of blocks 906, 908, 910, 912, 914. Additionally or alternatively, the sensor interface circuitry 602 can determine to select another one of the hydrogen concentration sensors 220, 222, 224 based on the continued operation of the gas turbine engine 106 (e.g., the leak detection system 500 can continuously check for leaks through a mission, etc.). If the sensor interface circuitry 602 determines another location of interest is to be selected, the operations 900 return to block 906. If the undercowl condition predictor circuitry 610 determines another location of interest is not to be selected, the operations 900 end and/or return to the operations 700 of FIG. 7.

Figure 10:
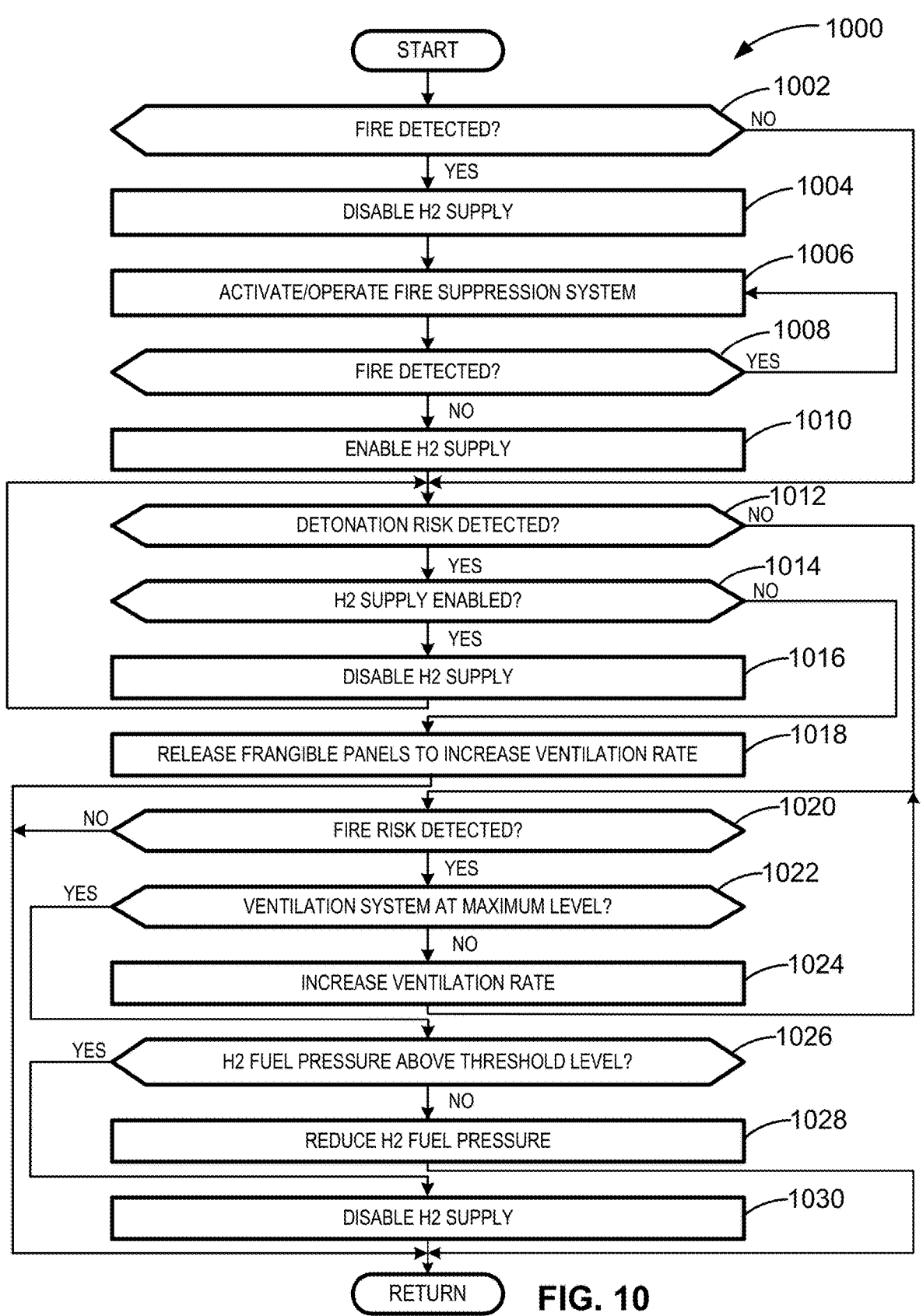

FIG. 10 is a flowchart representative of example machine readable instructions and/or example operations 1000 that may be executed, instantiated, and/or performed by programmable circuitry to mitigate a fire and/or leak identified within the undercowl 212 by the leak detection system 400 of FIG. 4 and the leak detection system 500 of FIG. 5. The operations 1000 begin at block 1002, the fire detector circuitry 606 and/or the leak and fire mitigation circuitry 616 can determine when there is a fire present within the undercowl 212. For example, the fire detector circuitry 606 can determine when a fire is present within the undercowl based on the fire detector output 410 (e.g., an output of the fire detection system 306 of FIG. 3, etc.). Additionally or alternatively, the leak and fire mitigation circuitry 616 can access (e.g., read, etc.) a memory associated with the aircraft 100, the fuel distribution system 102, and/or the gas turbine engine 106 (e.g., the memory 402 of FIG. 4, the memory 502 of FIG. 5, etc.) to determine when a fire was previously detected (e.g., during the execution of block 704 of FIG. 7, etc.) by a leak detection system of the aircraft 100 (e.g., the leak detection system 400 of FIG. 4, the leak detection system 500 of FIG. 5, etc.).

At block 1004, the system interface circuitry 618 disables the hydrogen supply of the fuel distribution system 102. For example, the system interface circuitry 618 can close a valve within the fuel distribution system 102 and/or the tank 104 to prevent hydrogen fuel from flowing into the gas turbine engine 106. Additionally or alternatively, the system interface circuitry 618 can stop operating a pump of the fuel distribution system 102 and/or the tank 104 to stop the flow of fuel through the fuel distribution system 102 and/or the tank 104. In some examples, the disabling of the hydrogen supply by the system interface circuitry 618 prevents further hydrogen from fueling the fire within the undercowl 212.

At block 1006, the system interface circuitry 618 can determine activate the fire suppression system 308 of FIG. 3. For example, the system interface circuitry 618 can cause the fire suppression system 308 to release a water mist, carbon dioxide, and/or a fire suppression chemical agent into the undercowl 212.

At block 1008, the fire detector circuitry 606 determines if a fire is still detected within the undercowl 212. For example, the fire detector circuitry 606 can determine if a fire is still present in the undercowl 212 in a manner similar to the execution of block 704 of FIG. 7 and/or block 1002. If the fire detector circuitry 606 determines that a fire is still present in the undercowl 212, the operations 1000 return to block 1006 (e.g., to continue the operation of the fire suppression system 308, etc.). If the fire detector circuitry 606 determines that a fire is not still present in the undercowl 212 (e.g., the fire has been suppressed, etc.), the operations 1000 advance to block 1010. At block 1010, the system interface circuitry 618 reenables the hydrogen supply. For example, the system interface circuitry 618 can revert the changes to the fuel distribution system 102 and/or the tank 104 to return flow of hydrogen fuel to the gas turbine engine 106. In some examples, when a severe leak (e.g., a leak causing a H2 concentration above the LFL and/or LDL, etc.) was detected within the undercowl 212, the execution of block 1010 can be omitted.

At block 1012, the leak and fire mitigation circuitry 616 determines if a detonation risk has been detected. For example, the leak and fire mitigation circuitry 616 can access (e.g., read, etc.) the memory 402 of FIG. 4 and/or the memory 502 of FIG. 5 to determine when a flag indicative of the LDL at a location within the undercowl 212 being exceeded (e.g., a flag set during the execution of block 814 of FIG. 8, a flag set during the execution of block 908 of FIG. 9, etc.). Additionally or alternatively, the leak and fire mitigation circuitry 616 can cause the fuel distribution controller circuitry 108 to execute the operations 800 and/or the operations 900 to determine when there is a detonation risk within the undercowl 212. In some such examples, when a detonation risk was previously detected and mitigated by the execution of blocks 1014 and 1016, the leak and fire mitigation circuitry 616 can remove a flag within the memory 402 of FIG. 4 and/or the memory 502 of FIG. 5. If the leak and fire mitigation circuitry 616 determines a detonation risk has been detected, the operations 1000 advance to block 1014. If the leak and fire mitigation circuitry 616 determines a detonation risk has not been detected, the operations 1000 advance to block 1020.

At block 1014, the system interface circuitry 618 determines if the hydrogen supply of the fuel distribution system 102 is enabled. For example, the system interface circuitry 618 can determine when the hydrogen of the fuel distribution system 102 was previously disabled (e.g., during the execution of block 1016, during the execution of block 1004, etc.). Additionally or alternatively, the system interface circuitry 618 can determine when the hydrogen supply of the fuel distribution system 102 based on an output of a sensor associated with the fuel distribution system 102, the tank 104, and/or the gas turbine engine 106. If the system interface circuitry 618 determines the hydrogen supply of the fuel distribution system 102 is enabled, the operations 1000 advance to block 1016. If the system interface circuitry 618 determines the hydrogen supply of the fuel distribution system 102 is not enabled (e.g., disabled, etc.), the operations 1000 advance to block 1018.

At block 1016, the system interface circuitry 618 disables the hydrogen supply of the fuel distribution system 102. For example, the system interface circuitry 618 can close a valve within the fuel distribution system 102 and/or the tank 104 to prevent hydrogen fuel from flowing into the gas turbine engine 106. Additionally or alternatively, the system interface circuitry 618 can stop operating a pump of the fuel distribution system 102 and/or the tank 104 to stop the flow of fuel through the fuel distribution system 102 and/or the tank 104.

At block 1018, the system interface circuitry 618 releases frangible panels to increase the ventilation rate of the undercowl 212. For example, the system interface circuitry 618 can cause the release of a portion of the core frame 204 into the bypass 211 to increase the ventilation of the undercowl 212 and to dissipate hydrogen within the undercowl 212, which mitigates the potential detonation risk of the undercowl 212. An example releasable frangible panel system is described in U.S. patent application Ser. No. 17/959, 400, which is hereby incorporated by reference in its entirety.

At block 1020, the leak and fire mitigation circuitry 616 determines if a fire risk has been detected. For example, the leak and fire mitigation circuitry 616 can access (e.g., read, etc.) the memory 402 of FIG. 4 and/or the memory 502 of FIG. 5 to determine when a flag indicative of the LFL at a location within the undercowl 212 being exceeded (e.g., a flag set during the execution of block 818 of FIG. 8, a flag set during the execution of block 914 of FIG. 9, etc.). Additionally or alternatively, the leak and fire mitigation circuitry 616 can cause the fuel distribution controller circuitry 108 to execute the operations 800 and/or the operations 900 to determine when there is a fire risk within the undercowl 212. In some such examples, when a fire risk was previously detected and mitigated by the execution of blocks 1022 and 1024, the leak and fire mitigation circuitry 616 can remove a flag within the memory 402 of FIG. 4 and/or the memory 502 of FIG. 5. If the leak and fire mitigation circuitry 616 determines a fire risk has been detected, the operations 1000 advance to block 1022. If the leak and fire mitigation circuitry 616 determines a fire risk has not been detected, the operations 1000 end and/or return to the operations 700 of FIG. 7.

At block 1022, the system interface circuitry 618 determines if the ventilation system 310 of FIG. 3 is operating at a maximum level. For example, the system interface circuitry 618 can determine when each of the controllable element(s) (e.g., an airflow valve, a fan, an opening with controllable size, etc.) of the ventilation system 310 is in a position that maximizes the ventilation rate of the undercowl 212 into the bypass 211. If the system interface circuitry 618 determines the when the ventilation system 310 of FIG. 3 is operating at a maximum level, the operations 1000 advance to block 1026. If the system interface circuitry 618 determines the ventilation system 310 of FIG. 3 is not operating at a maximum level, the operations 1000 advance to block 1024. At block 1024, the system interface circuitry 618 increases the ventilation rate of the ventilation system 310. For example, the system interface circuitry 618 can operate a controllable element of the ventilation system 310 to increase the ventilation of the undercowl 212. In some examples, the system interface circuitry 618 can increase the ventilation by a fixed amount. In other examples, the system interface circuitry 618 can increase the ventilation rate to a maximum rate of ventilation.

At block 1026, the system interface circuitry 618 determines if the hydrogen fuel pressure of the fuel distribution system 102 is above a threshold pressure. For example, the system interface circuitry 618 can determine the fuel pressure of the fuel distribution system 102 is based on one or more of the operational parameters 406 (e.g., the fuel system parameters 424, etc.) and/or an output of the fuel line sensor 226 of FIG. 2. In some examples, the system interface circuitry 618 can determine when the fuel pressure of the fuel distribution system 102 is above a minimum operating pressure of the gas turbine engine 106. In other examples, the system interface circuitry 618 can compare the fuel pressure to any other suitable threshold (e.g., an operator-set threshold, a regulation-based threshold, etc.). If the system interface circuitry 618 determines the hydrogen fuel pressure of the fuel distribution system 102 is above the threshold pressure, the operations 1000 advance to block 1028. If the system interface circuitry 618 determines the hydrogen fuel pressure of the fuel distribution system 102 is not above (e.g., equal to, less than, etc.) the threshold pressure, the operations 1000 advance to block 1030.

At block 1028, the system interface circuitry 618 reduces the hydrogen fuel pressure of the fuel distribution system 102. For example, the system interface circuitry 618 can operate a pump of the fuel distribution system 102 and/or a valve of the fuel distribution system 102 to reduce the pressure of the hydrogen fuel therein. In some examples, the system interface circuitry 618 can reduce the fuel pressure to the threshold pressure associated with the execution of block 1026. In other examples, the system interface circuitry 618 can reduce the fuel pressure by a fixed amount. At block 1030, the system interface circuitry 618 disables the hydrogen supply of the fuel distribution system 102. For example, the system interface circuitry 618 can close a valve within the fuel distribution system 102 and/or the tank 104 to prevent hydrogen fuel from flowing into the gas turbine engine 106. Additionally or alternatively, the system interface circuitry 618 can stop operating a pump of the fuel distribution system 102 and/or the tank 104 to stop the flow of fuel through the fuel distribution system 102 and/or the tank 104. The operations 1000 end and/or return to the operations 700 of FIG. 7.

Figure 11:
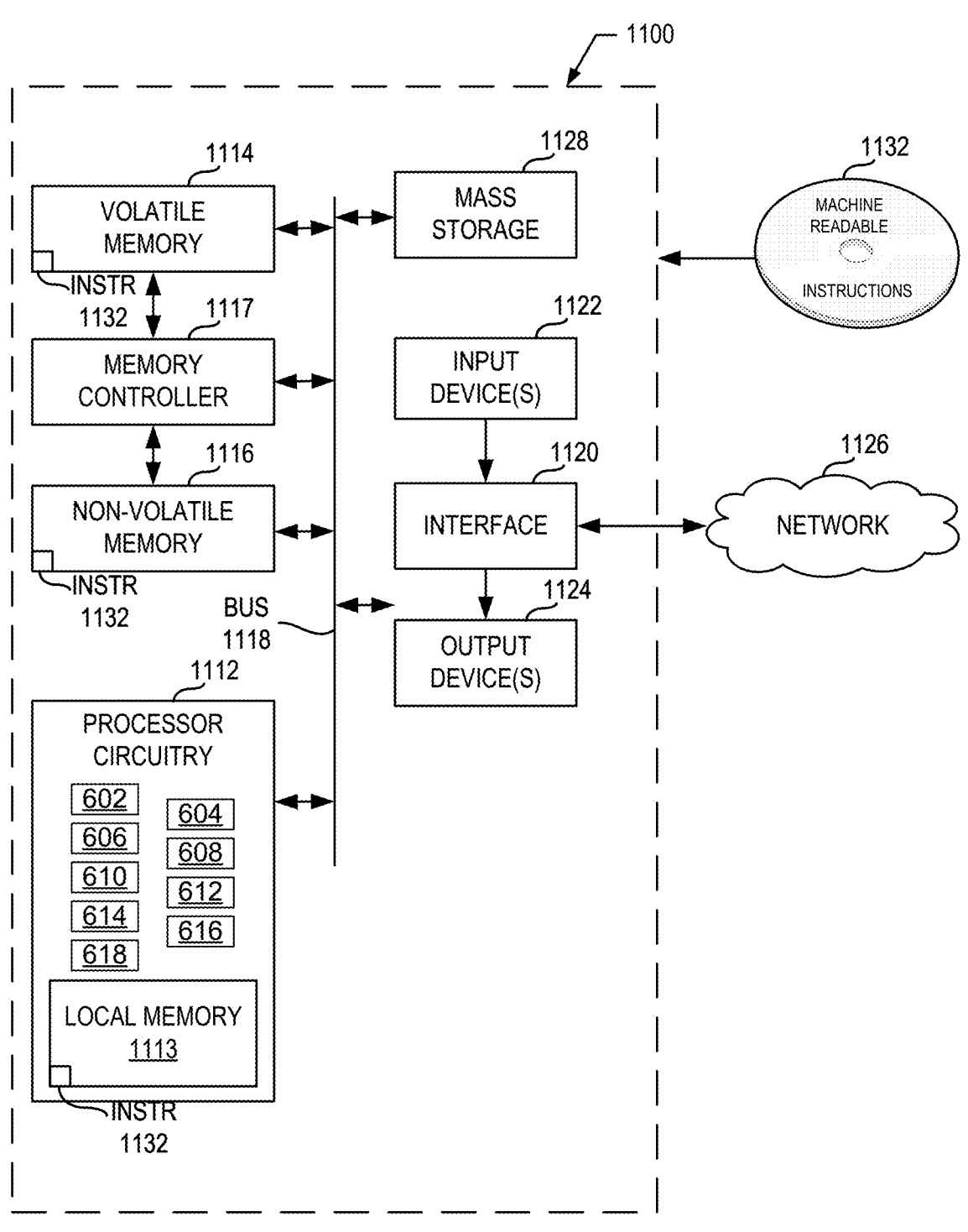
FIG. 11 is a block diagram of an example processing platform including programmable circuitry structured to execute, instantiate, and/or perform the example machine readable instructions and/or perform the example operations of FIGS. 7-10 to implement the fuel distribution controller circuitry of FIG. 6.

FIG. 11 is a block diagram of an example programmable circuitry platform 1100 structured to execute and/or instantiate the example machine-readable instructions and/or the example operations of FIGS. 7-10 to implement the fuel distribution controller circuitry of FIG. 6. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices. In this example, the programmable circuitry 1112 implements the sensor interface circuitry 602, the memory interface circuitry 604, the fire detector circuitry 606, the threshold determiner circuitry 608, the undercowl condition predictor circuitry 610, the hydrogen concentration predictor circuitry 612, the threshold comparator circuitry 614, and the system interface circuitry 618.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1132, which may be implemented by the machine readable instructions of FIGS. 7-10, may be stored in the mass storage device 1128, in the volatile memory 1114, in the non-volatile memory 1116, and/or on at least one non-transitory computer readable storage medium such as a CD or DVD which may be removable.

From the foregoing, it will be appreciated that example systems, apparatus, articles of manufacture, and methods have been disclosed that detect and mitigate leaks and fires detected within a gas turbine engines. Examples disclosed herein reduce the likelihood of negative effects from hydrogen leaks within the engine undercowl, such as fires. Examples disclosed herein reduce potential fuel waste from undetected fuel leaks within the gas turbine engine. Disclosed systems, apparatus, articles of manufacture, and methods are accordingly directed to one or more improvement(s) in the operation of a machine such as a gas turbine engine.

Leak detection and mitigation for hydrogen fueled aircraft are disclosed herein. Further examples and combinations are provided by the subject matter of the following clauses:

An apparatus comprising machine readable instructions, and programmable circuitry to at least one of instantiate or execute the machine readable instructions to determine a hydrogen concentration threshold for a location within an undercowl of an engine of an aircraft, based on an engine condition of the aircraft, determine, based on an output of a hydrogen concentration sensor within the undercowl, a hydrogen concentration at the location, compare the hydrogen concentration to the hydrogen concentration threshold, and conduct a mitigation action in a hydrogen fuel distribution system based on the comparison of the hydrogen concentration and the hydrogen concentration threshold.

The apparatus of any preceding clause, wherein the engine condition includes at least one of a mission phase of the aircraft, a fuel pressure, a fuel flow rate, an airflow rate in the undercowl, a temperature of the undercowl, an altitude of the aircraft, or a speed of the engine of the aircraft.

The apparatus of any preceding clause, wherein the programmable circuitry determines the hydrogen concentration threshold based on a lower flammability limit of hydrogen at the location.

The apparatus of any preceding clause, wherein the location is distal to the hydrogen concentration sensor and the programmable circuitry is further to predict a temperature and a pressure at the location, and determine the lower flammability limit at the location based the temperature and the pressure.

The apparatus of any preceding clause, wherein the programmable circuitry is to conduct the mitigation action in the hydrogen fuel distribution system by at least one of increase a rate of ventilation of the hydrogen fuel distribution system, or reduce a fuel pressure of the hydrogen fuel distribution system.

The apparatus of any preceding clause, wherein the location is distal to the hydrogen concentration sensor and the programmable circuitry is further to predict a temperature and a pressure at the location, and determine a lower detonation limit of hydrogen at the location based the temperature and the pressure.

The apparatus of any preceding clause, wherein the programmable circuitry is to conduct the mitigation action in the hydrogen fuel distribution system by at least one of disable the hydrogen fuel distribution system, or activate a frangible panel system.

A non-transitory computer readable medium comprising instructions, which, when executed, cause programmable circuitry to determine a hydrogen concentration threshold for a location within an undercowl of an engine of an aircraft, based on an engine condition of the aircraft, determine, based on an output of a hydrogen concentration sensor within the undercowl, a hydrogen concentration at the location, compare the hydrogen concentration to the hydrogen concentration threshold, and conduct a mitigation action in a hydrogen fuel distribution system based on the comparison of the hydrogen concentration and the hydrogen concentration threshold.

The non-transitory machine readable storage medium of any preceding clause, wherein the engine condition includes at least one of a mission phase of the aircraft, a fuel pressure, a fuel flow rate, an airflow rate in the undercowl, a temperature of the undercowl, an altitude of the aircraft, or a speed of the engine of the aircraft.

The non-transitory machine readable storage medium of any preceding clause, wherein the instructions, when executed, causes the programmable circuitry to determine the hydrogen concentration threshold based on a lower flammability limit of hydrogen at the location.

The non-transitory machine readable storage medium of any preceding clause, wherein the location is distal to the hydrogen concentration sensor and the instructions, when executed, cause the programmable circuitry to predict a temperature and a pressure at the location, and determine the lower flammability limit at the location based the temperature and the pressure.

The non-transitory machine readable storage medium of any preceding clause, wherein the instructions, when executed, cause the programmable circuitry is to conduct the mitigation action in the hydrogen fuel distribution system by at least one of increase a rate of ventilation of the hydrogen fuel distribution system, or reduce a fuel pressure of the hydrogen fuel distribution system.

The non-transitory machine readable storage medium of any preceding clause, wherein the location is distal to the hydrogen concentration sensor and the instructions, when executed, cause programmable circuitry is further to predict a temperature and a pressure at the location, and determine a lower detonation limit of hydrogen at the location based the temperature and the pressure.

The non-transitory machine readable storage medium of any preceding clause, wherein the instructions, when executed, cause the programmable circuitry to conduct the mitigation action in the hydrogen fuel distribution system by at least one of disable the hydrogen fuel distribution system, or activate a frangible panel system.

A method for operating a hydrogen fuel distribution system for an aircraft, the method comprising determining a hydrogen concentration threshold for a location within an undercowl of an engine of the aircraft, based on an engine condition of the aircraft, determining, based on an output of a hydrogen concentration sensor within the undercowl, a hydrogen concentration at the location, comparing the hydrogen concentration to the hydrogen concentration threshold, and operating the hydrogen fuel distribution system based on the comparison of the hydrogen concentration and the hydrogen concentration threshold.

The method of any preceding clause, wherein the determining of the hydrogen concentration threshold is based on a lower flammability limit of hydrogen at the location.

The method of any preceding clause, wherein the location is distal to the hydrogen concentration sensor, the method including predicting a temperature and a pressure at the location, and determining the lower flammability limit at the location based the temperature and the pressure.

The method of any preceding clause, wherein the operating the hydrogen fuel distribution system includes at least one of increasing a rate of ventilation of the hydrogen fuel distribution system, or reducing a fuel pressure of the hydrogen fuel distribution system.

The method of any preceding clause, wherein the location is distal to the hydrogen concentration sensor, the method including predicting a temperature and a pressure at the location, and determining a lower detonation limit of hydrogen at the location based the temperature and the pressure.

The method of any preceding clause, wherein the operating the hydrogen fuel distribution system includes at least one of disabling the hydrogen fuel distribution system, or activating a frangible panel system.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
machine readable instructions; and
programmable circuitry to at least one of instantiate or execute the machine readable instructions to:
    determine a hydrogen concentration threshold for a location within an undercowl of an engine of an aircraft, based on an engine condition of the aircraft;
    determine, based on an output of a hydrogen concentration sensor within the undercowl, a hydrogen concentration at the location;
    compare the hydrogen concentration to the hydrogen concentration threshold; and
    conduct a mitigation action in a hydrogen fuel distribution system based on the comparison of the hydrogen concentration and the hydrogen concentration threshold.

2. The apparatus of claim 1, wherein the engine condition includes at least one of a mission phase of the aircraft, a fuel pressure, a fuel flow rate, an airflow rate in the undercowl, a temperature of the undercowl, an altitude of the aircraft, or a speed of the engine of the aircraft.

3. The apparatus of claim 1, wherein the programmable circuitry determines the hydrogen concentration threshold based on a lower flammability limit of hydrogen at the location.

4. The apparatus of claim 3, wherein the location is distal to the hydrogen concentration sensor and the programmable circuitry is further to:
    predict a temperature and a pressure at the location; and
    determine the lower flammability limit at the location based the temperature and the pressure.

5. The apparatus of claim 3, wherein the programmable circuitry is to conduct the mitigation action in the hydrogen fuel distribution system by at least one of:
    increase a rate of ventilation of the hydrogen fuel distribution system; or
    reduce a fuel pressure of the hydrogen fuel distribution system.

6. The apparatus of claim 1, wherein the location is distal to the hydrogen concentration sensor and the programmable circuitry is further to:
    predict a temperature and a pressure at the location; and determine a lower detonation limit of hydrogen at the location based the temperature and the pressure.

7. The apparatus of claim 6, wherein the programmable circuitry is to conduct the mitigation action in the hydrogen fuel distribution system by at least one of:
    disable the hydrogen fuel distribution system; or
    activate a frangible panel system.

8. A non-transitory computer readable medium comprising instructions, which, when executed, cause programmable circuitry to:
    determine a hydrogen concentration threshold for a location within an undercowl of an engine of an aircraft, based on an engine condition of the aircraft;
    determine, based on an output of a hydrogen concentration sensor within the undercowl, a hydrogen concentration at the location;
    compare the hydrogen concentration to the hydrogen concentration threshold; and
    conduct a mitigation action in a hydrogen fuel distribution system based on the comparison of the hydrogen concentration and the hydrogen concentration threshold.

9. The non-transitory computer readable medium of claim 8, wherein the engine condition includes at least one of a mission phase of the aircraft, a fuel pressure, a fuel flow rate, an airflow rate in the undercowl, a temperature of the undercowl, an altitude of the aircraft, or a speed of the engine of the aircraft.

10. The non-transitory computer readable medium of claim 8, wherein the instructions, when executed, causes the programmable circuitry to determine the hydrogen concentration threshold based on a lower flammability limit of hydrogen at the location.

11. The non-transitory computer readable medium of claim 10, wherein the location is distal to the hydrogen concentration sensor and the instructions, when executed, cause the programmable circuitry to:
    predict a temperature and a pressure at the location; and
    determine the lower flammability limit at the location based the temperature and the pressure.

12. The non-transitory computer readable medium of claim 10, wherein the instructions, when executed, cause the programmable circuitry to conduct the mitigation action in the hydrogen fuel distribution system by at least one of:
    increase a rate of ventilation of the hydrogen fuel distribution system; or
    reduce a fuel pressure of the hydrogen fuel distribution system.

13. The non-transitory computer readable medium of claim 8, wherein the location is distal to the hydrogen concentration sensor and the instructions, when executed, cause programmable circuitry is further to:
    predict a temperature and a pressure at the location; and
    determine a lower detonation limit of hydrogen at the location based the temperature and the pressure.

14. The non-transitory computer readable medium of claim 13, wherein the instructions, when executed, cause the programmable circuitry to conduct the mitigation action in the hydrogen fuel distribution system by at least one of:
    disable the hydrogen fuel distribution system; or
    activate a frangible panel system.

15. A method for operating a hydrogen fuel distribution system for an aircraft, the method comprising:
    determining a hydrogen concentration threshold for a location within an undercowl of an engine of the aircraft, based on an engine condition of the aircraft;

determining, based on an output of a hydrogen concentration sensor within the undercowl, a hydrogen concentration at the location;

comparing the hydrogen concentration to the hydrogen concentration threshold; and operating the hydrogen fuel distribution system based on the comparison of the hydrogen concentration and the hydrogen concentration threshold.

16. The method of claim 15, wherein the determining of the hydrogen concentration threshold is based on a lower flammability limit of hydrogen at the location.

17. The method of claim 16, wherein the location is distal to the hydrogen concentration sensor, the method including:

predicting a temperature and a pressure at the location; and determining the lower flammability limit at the location based the temperature and the pressure.

18. The method of claim 16, wherein the operating the hydrogen fuel distribution system includes at least one of:

increasing a rate of ventilation of the hydrogen fuel distribution system; or reducing a fuel pressure of the hydrogen fuel distribution system.

19. The method of claim 15, wherein the location is distal to the hydrogen concentration sensor, the method including:

predicting a temperature and a pressure at the location; and determining a lower detonation limit of hydrogen at the location based the temperature and the pressure.

20. The method of claim 19, wherein the operating the hydrogen fuel distribution system includes at least one of:

disabling the hydrogen fuel distribution system; or activating a frangible panel system.

* * * * *